US008887184B2

(12) United States Patent
Klappert et al.

(10) Patent No.: US 8,887,184 B2
(45) Date of Patent: Nov. 11, 2014

(54) SYSTEMS AND METHODS FOR PROVIDING REMOTE ACCESS TO INTERACTIVE MEDIA GUIDANCE APPLICATIONS

(75) Inventors: Walter R. Klappert, Los Angeles, CA (US); Akitaka Nishimura, Tokyo (JP); Asahi Iwanaga, Tokyo (JP); Akio Yoshimoto, Kanagawa (JP)

(73) Assignee: United Video Properties, Inc., Santa Clara, CA (US)

( * ) Notice: Subject to any disclaimer, the term of this patent is extended or adjusted under 35 U.S.C. 154(b) by 0 days.

(21) Appl. No.: 13/092,756

(22) Filed: Apr. 22, 2011

(65) Prior Publication Data

US 2011/0202958 A1 Aug. 18, 2011

Related U.S. Application Data

(60) Continuation of application No. 12/827,192, filed on Jun. 30, 2010, which is a division of application No. 11/643,507, filed on Dec. 20, 2006, now Pat. No. 8,209,424.

(51) Int. Cl.
*H04N 7/173* (2011.01)
*H04N 7/16* (2011.01)
(Continued)

(52) U.S. Cl.
CPC ......... *H04N 21/435* (2013.01); *H04N 21/4314* (2013.01); *H04N 5/775* (2013.01); *H04N 21/4104* (2013.01); *H04N 21/4312* (2013.01); *H04N 21/47214* (2013.01); *H04N 5/85* (2013.01); *H04N 5/76* (2013.01); *H04N 21/47* (2013.01); *H04N 21/4583* (2013.01); *H04N 21/42204* (2013.01); *H04N 5/44543* (2013.01); *H04N 9/8042* (2013.01); *H04N 21/44222* (2013.01); *H04N 21/47202* (2013.01); *H04N 21/482* (2013.01); *H04N 21/235* (2013.01); *H04N 5/907* (2013.01); *H04N 21/488* (2013.01); *H04N 21/4227* (2013.01);
(Continued)

(58) Field of Classification Search
USPC .................................. 725/9, 10, 15, 97, 106
See application file for complete search history.

(56) References Cited

U.S. PATENT DOCUMENTS 4,429,385 A 1/1984 Cichelli et al.
4,625,080 A 11/1986 Scott
(Continued)

FOREIGN PATENT DOCUMENTS

DE 31 51 492 A1 7/1983
DE 195 31 121 A1 2/1997
(Continued)

OTHER PUBLICATIONS

"Honey, is there anything good on the remote tonight?," advertisement from Multichannel News, Broadband Week Section, p. 168, Nov. 30, 1998.
(Continued)

*Primary Examiner* — Kieu Oahn T Bui
(74) *Attorney, Agent, or Firm* — Ropes & Gray LLP

(57) ABSTRACT

Systems and methods for providing remote access to interactive media guidance applications are provided. In particular, the systems and methods for providing remote access to interactive media guidance applications provided herein generally relate to enhancing remote access capabilities by providing algorithms and techniques for managing and correcting disparities that may be found between program listings data used by the interactive media guidance application and the remote access server.

35 Claims, 17 Drawing Sheets

(51) Int. Cl.

| | |
|---|---|
| *H04N 21/431* | (2011.01) |
| *H04N 21/472* | (2011.01) |
| *H04N 5/76* | (2006.01) |
| *H04N 21/458* | (2011.01) |
| *H04N 5/445* | (2011.01) |
| *H04N 21/442* | (2011.01) |
| *H04N 21/482* | (2011.01) |
| *H04N 21/235* | (2011.01) |
| *H04N 21/4227* | (2011.01) |
| *H04N 21/462* | (2011.01) |
| *H04N 21/435* | (2011.01) |
| *H04N 21/433* | (2011.01) |
| *H04N 5/775* | (2006.01) |
| *H04N 21/41* | (2011.01) |
| *H04N 5/85* | (2006.01) |
| *H04N 21/47* | (2011.01) |
| *H04N 21/422* | (2011.01) |
| *H04N 9/804* | (2006.01) |
| *H04N 5/907* | (2006.01) |
| *H04N 21/488* | (2011.01) |
| *H04N 9/82* | (2006.01) |
| *H04N 5/45* | (2011.01) |
| *H04N 5/44* | (2011.01) |
| *H04N 5/765* | (2006.01) |
| *H04N 5/781* | (2006.01) |

(52) U.S. Cl.
CPC ......... *H04N 21/4622* (2013.01); *H04N 9/8205* (2013.01); *H04N 5/45* (2013.01); *H04N 21/4316* (2013.01); *H04N 2005/4425* (2013.01); *H04N 5/765* (2013.01); *H04N 5/781* (2013.01); *H04N 21/4334* (2013.01); *H04N 21/4828* (2013.01)
USPC .............. 725/9; 725/10; 725/97; 725/106; 725/133; 725/153

(56) References Cited

U.S. PATENT DOCUMENTS

| | | |
|---|---|---|
| 4,706,121 A | 11/1987 | Young |
| 4,751,578 A | 6/1988 | Reiter |
| 4,761,684 A | 8/1988 | Clark et al. |
| 4,787,063 A | 11/1988 | Muguet |
| 4,908,707 A | 3/1990 | Kinghorn |
| 5,036,314 A | 7/1991 | Barillari et al. |
| 5,089,885 A | 2/1992 | Clark |
| 5,113,259 A | 5/1992 | Romesburg et al. |
| 5,132,992 A | 7/1992 | Yurt et al. |
| 5,155,591 A | 10/1992 | Wachob |
| 5,223,924 A | 6/1993 | Strubbe |
| 5,233,423 A | 8/1993 | Jernigan et al. |
| 5,253,066 A | 10/1993 | Vogel |
| 5,335,277 A | 8/1994 | Harvey et al. |
| 5,353,121 A | 10/1994 | Young et al. |
| 5,359,367 A | 10/1994 | Stockill |
| 5,382,983 A | 1/1995 | Kwoh et al. |
| 5,410,326 A | 4/1995 | Goldstein |
| 5,414,756 A | 5/1995 | Levine |
| 5,455,570 A | 10/1995 | Cook et al. |
| 5,465,113 A | 11/1995 | Gilboy |
| 5,469,206 A | 11/1995 | Strubbe et al. |
| 5,479,266 A | 12/1995 | Young et al. |
| 5,479,268 A | 12/1995 | Young et al. |
| 5,481,296 A | 1/1996 | Cragun et al. |
| 5,483,278 A | 1/1996 | Strubbe et al. |
| 5,502,504 A | 3/1996 | Marshall et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,534,911 A | 7/1996 | Levitan |
| 5,550,576 A | 8/1996 | Klosterman |
| 5,559,548 A | 9/1996 | Davis et al. |
| 5,559,549 A | 9/1996 | Hendricks et al. |
| 5,559,550 A | 9/1996 | Mankovitz |
| 5,570,295 A | 10/1996 | Isenberg et al. |
| 5,572,442 A | 11/1996 | Schulhof et al. |
| 5,579,239 A | 11/1996 | Freeman et al. |
| 5,583,560 A | 12/1996 | Florin et al. |
| 5,585,838 A | 12/1996 | Lawler et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,596,373 A | 1/1997 | White et al. |
| 5,600,364 A | 2/1997 | Hendricks et al. |
| 5,606,374 A | 2/1997 | Bertram |
| 5,617,526 A | 4/1997 | Oran et al. |
| 5,619,249 A | 4/1997 | Billock et al. |
| 5,621,456 A | 4/1997 | Florin et al. |
| 5,623,613 A | 4/1997 | Rowe et al. |
| 5,629,733 A | 5/1997 | Youman et al. |
| 5,630,119 A | 5/1997 | Aristides et al. |
| 5,631,995 A | 5/1997 | Weissensteiner et al. |
| 5,635,978 A | 6/1997 | Alten et al. |
| 5,635,979 A | 6/1997 | Kostreski et al. |
| 5,640,484 A | 6/1997 | Mankovitz |
| 5,654,748 A | 8/1997 | Matthews, III |
| 5,657,072 A | 8/1997 | Aristides et al. |
| 5,666,293 A | 9/1997 | Metz et al. |
| 5,675,390 A | 10/1997 | Schindler et al. |
| 5,682,206 A | 10/1997 | Wehmeyer et al. |
| 5,692,214 A | 11/1997 | Levine |
| 5,694,163 A | 12/1997 | Harrison |
| 5,699,107 A | 12/1997 | Lawler et al. |
| 5,710,601 A | 1/1998 | Marshall et al. |
| 5,734,853 A | 3/1998 | Hendricks et al. |
| 5,734,893 A | 3/1998 | Li et al. |
| 5,748,191 A | 5/1998 | Rozak et al. |
| 5,748,716 A | 5/1998 | Levine |
| 5,758,257 A | 5/1998 | Herz et al. |
| 5,758,259 A | 5/1998 | Lawler |
| 5,781,246 A | 7/1998 | Alten et al. |
| 5,787,259 A | 7/1998 | Haroun et al. |
| 5,788,507 A | 8/1998 | Redford et al. |
| 5,790,202 A | 8/1998 | Kummer et al. |
| 5,793,964 A | 8/1998 | Rogers et al. |
| 5,798,785 A | 8/1998 | Hendricks et al. |
| 5,812,931 A | 9/1998 | Yuen |
| 5,828,420 A | 10/1998 | Marshall et al. |
| 5,844,505 A * | 12/1998 | Van Ryzin ............... 340/988 |
| 5,844,620 A | 12/1998 | Coleman et al. |
| 5,850,218 A | 12/1998 | LaJoie et al. |
| 5,867,233 A | 2/1999 | Tanaka |
| 5,880,768 A | 3/1999 | Lemmons et al. |
| 5,886,732 A | 3/1999 | Humpleman |
| 5,907,323 A | 5/1999 | Lawler et al. |
| 5,914,746 A | 6/1999 | Matthews, III et al. |
| 5,977,964 A | 11/1999 | Williams et al. |
| 5,988,078 A | 11/1999 | Levine |
| 6,002,394 A | 12/1999 | Schein et al. |
| 6,006,257 A | 12/1999 | Slezak |
| 6,097,441 A | 8/2000 | Allport |
| 6,104,334 A | 8/2000 | Allport |
| 6,130,726 A | 10/2000 | Darbee et al. |
| 6,208,384 B1 | 3/2001 | Schultheiss |
| 6,233,734 B1 | 5/2001 | Macrae et al. |
| 6,239,794 B1 | 5/2001 | Yuen et al. |
| 6,263,501 B1 | 7/2001 | Schein et al. |
| 6,268,849 B1 | 7/2001 | Boyer et al. |
| 6,310,886 B1 | 10/2001 | Barton |
| 6,331,877 B1 | 12/2001 | Bennington et al. |
| 6,357,043 B1 | 3/2002 | Ellis et al. |
| 6,388,714 B1 | 5/2002 | Schein et al. |
| 6,463,585 B1 | 10/2002 | Hendricks et al. |
| 6,509,908 B1 | 1/2003 | Croy et al. |
| 6,564,378 B1 | 5/2003 | Satterfield et al. |
| 6,611,654 B1 | 8/2003 | Shteyn |

(56) References Cited

U.S. PATENT DOCUMENTS

| | | |
|---|---|---|
| 6,756,997 B1 | 6/2004 | Ward, III et al. |
| 6,760,537 B2 | 7/2004 | Mankovitz |
| 7,088,952 B1 | 8/2006 | Saito et al. |
| 7,165,098 B1 | 1/2007 | Boyer et al. |
| 7,344,084 B2 * | 3/2008 | DaCosta .................. 235/472.01 |
| 8,131,883 B1 | 3/2012 | Reisman |
| 2001/0030667 A1 | 10/2001 | Kelts |
| 2002/0157009 A1 | 10/2002 | Yamamoto et al. |
| 2002/0174430 A1 | 11/2002 | Ellis et al. |
| 2003/0023987 A1 | 1/2003 | Hiramoto et al. |
| 2003/0051246 A1 | 3/2003 | Wilder et al. |
| 2003/0095791 A1 | 5/2003 | Barton et al. |
| 2003/0110499 A1 | 6/2003 | Knudson et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0193519 A1 | 10/2003 | Hayes et al. |
| 2003/0196201 A1 | 10/2003 | Schein et al. |
| 2003/0208756 A1 | 11/2003 | Macrae et al. |
| 2004/0078817 A1 | 4/2004 | Horowitz et al. |
| 2005/0028208 A1 | 2/2005 | Ellis et al. |
| 2005/0213938 A1 * | 9/2005 | Ozawa et al. .................. 386/83 |
| 2005/0251827 A1 | 11/2005 | Ellis et al. |
| 2005/0278737 A1 | 12/2005 | Ma et al. |
| 2005/0285714 A1 * | 12/2005 | Hirose et al. .................. 340/3.54 |
| 2006/0031883 A1 | 2/2006 | Ellis et al. |
| 2006/0184579 A1 | 8/2006 | Mils et al. |
| 2009/0031006 A1 * | 1/2009 | Johnson ........................ 709/218 |

FOREIGN PATENT DOCUMENTS

| | | |
|---|---|---|
| DE | 197 40 079 A1 | 3/1999 |
| EP | 0 774 853 A2 | 5/1997 |
| EP | 0 793 225 A2 | 9/1997 |
| EP | 0 805 594 A2 | 11/1997 |
| GB | 2265792 | 10/1993 |
| JP | 3-22770 | 1/1991 |
| JP | 8-56352 | 2/1996 |
| JP | 9-102827 | 4/1997 |
| WO | WO 87/03766 | 6/1987 |
| WO | WO 89/03085 | 4/1989 |
| WO | WO 94/14282 | 6/1994 |
| WO | WO 94/15284 | 7/1994 |
| WO | WO 95/01056 | 1/1995 |
| WO | WO 95/01059 | 1/1995 |
| WO | WO 95/10910 | 4/1995 |
| WO | WO 95/28055 | 10/1995 |
| WO | WO 95/32585 | 11/1995 |
| WO | WO 96/07270 | 3/1996 |
| WO | WO 96/13932 | 5/1996 |
| WO | WO 96/20555 | 7/1996 |
| WO | WO 97/13368 | 4/1997 |
| WO | WO 97/31480 | 8/1997 |
| WO | WO 97/36422 | 10/1997 |
| WO | WO 97/47106 | 12/1997 |
| WO | WO 97/47143 | 12/1997 |
| WO | WO 97/49237 | 12/1997 |
| WO | WO 97/50251 | 12/1997 |
| WO | WO 98/10589 | 3/1998 |
| WO | WO 98/16062 | 4/1998 |
| WO | WO 98/17064 | 4/1998 |
| WO | WO 98/26584 | 6/1998 |
| WO | WO 98/56173 | 12/1998 |
| WO | WO 98/56176 | 12/1998 |
| WO | WO 99/04570 | 1/1999 |
| WO | WO 99/14947 | 3/1999 |
| WO | WO 99/30491 | 6/1999 |
| WO | WO 99/60783 | 11/1999 |
| WO | WO-03051042 | 6/2003 |
| WO | WO 2005/094073 | 10/2005 |

OTHER PUBLICATIONS

"How Evolve Works," from the Internet at http://www.evolveproducts.com/network.html, printed on Dec. 28, 1998.

"Jini™ Architecture Overview," by Jim Waldo, from the Internet at http://Java.sun.com/products/jini/whitepapers/architectureoverview.pdf/, printed on Jan. 25, 1999. The document bears a copyright date of 1998.

"Reaching your subscribers is a complex and costly process-until now," from the Internet at http://www.evolveproducts.com/info.html, printed on Dec. 28, 1998.

Curt Rogers, "Telcos vs. Cable TV: The Global View," Data Communications, No. 13, New York, pp, 75, 76, 78 and 80, Sep. 1995.

"Sun's Next Steps in Digital Set-Tops," article in Cablevision, p. 56, Nov. 16, 1998.

"The Evolve EZ Guide. The Remote. Control," from the Internet at http://www.evolveproducts.com/display2.html, printed on Dec. 28, 1998.

"Using StarSight 2," published before Apr. 19, 1995.

Von Andreas Neumann, "WDR Online Aufbau Und Perspektiven Automatisierter Online-Dienste Im WDR," Rundfunktechnische Mitteilungen, vol. 41, pp. 56-66, Jun. 1997.

Von Gerhard Eitz, "Zukünftige Informations—Und Datenangebote Beirn Digitalen Fernsehen—EPG Und "Lesezeichen"," Rundfunktechnische Mitteilungen, vol. 41, pp. 67-72, Jun. 1997.

"What is Jini?," from the Internet at http://java.sun.com/products/jini/whitepapers/whatsjini.pdf, printed on Jan. 25, 1999.

"Why Jini Now?," from the internet at http://java.sun.com/products/jini/whitepapers/whyjininow.pdf, printed on Jan. 25, 1999. the document bears a copyright date of 1998.

Office Action dated Jan. 29, 2009, U.S. Appl. No. 11/643,229.

* cited by examiner

SET RECORDING

Select and review the options below and press "Confirm" to submit your request. ~702

| | |
|---|---|
| Name | Crocodile Hunter's Croc Files |
| Channel | 100 ~704 |
| Air Date | Monday, November 13 ~706 |
| Start Time | 2:00 PM ~708 |
| Duration | 30 minutes ~718 |
| Start Recording | On-time ~712 |
| Stop Recording | On-time ~714 |
| Save Until | Space is needed ~716 |

✓ CONFIRM ~710          ⊘ CANCEL ~720

SET REMINDER
750

Select and review the options below and press "Confirm" to submit your request.

| | |
|---|---|
| Name | Crocodile Hunter's Croc Files — 752 |
| Channel | 100 — 754 |
| Air Date | Monday, November 13 — 756 |
| Start Time | 2:00 PM — 758 |
| Duration | 30 minutes — 768 |
| Start Reminder | On-time ▽ — 762 |
| Stop Reminder | On-time ▽ — 764 |
| Save Reminder Until | End of Season ▽ — 766 |

[✓] CONFIRM — 760

[⊘] CANCEL — 770

FIG. 7B

| Remote Access Listings Source ID | Media GuidanceProgram Listings 1 Source ID | ... | Media Guidance Program Listings "N" Source ID |
|---|---|---|---|
| HBO - East | HBO-104-901 | ... | HBO - E41 - 235 |
| HBO - West | HBO-104-902 | ... | HBO - W41 - 235 |
| HBO - North | HBO-104-903 | ... | HBO - N41 - 235 |
| Spike TV - Los Angeles | SPK - 201 - 431 | ... | Spike - Los Angeles |
| Harbor - Time Warner | WB - 550 - 230 | ... | Time Warner - 90017 |

FIG. 11A

| Remote Access Listings Program ID | Media Guidance Program Listings 1 Program ID | ... | Media Guidance Program Listings "N" Program ID |
|---|---|---|---|
| The Crocodile Hunter | Crocodile Hunter's Jungle | ... | Steve Irwin- Croc Files |
| Nanny 911 | Super Nannies | ... | Nanny 911 to the Rescue |
| Barney & Friends | Barney and Friends | ... | 105-NOG-Barney |
| 111-OETA-Lions | Between the Lions | ... | 111-OETA-Lions |

SYSTEMS AND METHODS FOR PROVIDING REMOTE ACCESS TO INTERACTIVE MEDIA GUIDANCE APPLICATIONS

CROSS REFERENCE TO RELATED APPLICATIONS

This application is a continuation of U.S. patent application Ser. No. 12/827,192, filed Jun. 30, 2010, which is a division of U.S. patent application Ser. No. 11/643,507, filed Dec. 20, 2006, both of which are hereby incorporated by reference herein in their entireties.

BACKGROUND OF THE INVENTION

This invention relates generally to media systems, and more particularly, to systems and methods for providing remote access to interactive media guidance applications.

Recent advances in media communications technology have made it possible for users to access interactive media guidance applications implemented on user equipment without being in physical proximity to the user equipment. For example, users of interactive media guidance applications in some systems may remotely schedule recordings of television programs. In such systems, the user's set-top box is coupled to a remote program guide access server through a communications network. When away from home, the user may connect to the remote access server (or an intermediate server such as a web server) through a device, such as a personal computer, to remotely schedule recording with the interactive media guidance application on the user's in-home set-top box.

However, to work properly, such a system needs a consistent way of identifying programs for recording. When a single service provider provides the program data for the remote access server and the interactive media guidance application, this is not a problem since the same data may be used across the system. However, when the remote access server and the interactive media guidance application use different data for identification purposes, problems can occur. For example, the remote access system may be generating action requests for programs on a selected channel based on regional programming information, but the interactive media guidance application may be using local programming information that differs from the regional programming information. Furthermore, for channels that change providers depending on the time of day, for example, the remote access system may be using the data for the daytime service provider, when a user intends to request an action for the nighttime service provider. As a result, a user may, for example, inadvertently set up recording for the wrong program based on incorrect programming information supplied by the remote access recording system. For programs, such as series, that build on previous episodes, such errors can prove extremely frustrating for enthusiastic followers and lead to less than satisfactory television viewing experience.

In view of the foregoing, it would be desirable to provide remote access systems and methods that support algorithms and techniques for managing and correcting the disparities that may be found between program listings data when providing remote access to functions on interactive media guidance applications.

SUMMARY OF THE INVENTION

In accordance with the principles of the present invention, systems and methods for providing remote access to interactive media guidance applications are provided. In particular, the systems and methods for providing remote access to interactive media guidance applications provided herein generally relate to enhancing remote access capabilities by providing algorithms and techniques for managing and correcting disparities that may be found between program listings data used by the interactive media guidance application on the user equipment and that used by the remote access server.

In a typical usage scenario, a user not within physical proximity to the user equipment may wish to remotely set up a recording, set up a reminder, or perform other program-specific functions with the interactive media guidance application on the user equipment. Using a remote access user device such as a personal computer, a mobile computer, a cellular telephone, an automobile navigational device, or other suitable remote access user device, the user may authenticate with a remote access server (or an intermediate server such as a web sever) to remotely access the interactive media guidance application on the user equipment. In some embodiments, the remote access user device may have location positioning functionality (e.g., GPS functionality) by which the program information data source used by the remote access server may be selected.

The user's remote access request may be included in an action request, which may include program-specific parameters such as a start-time and a channel, and transmitted for processing by the interactive media guidance application on the user equipment. In some embodiments, the action request may be generated by the remote access user device and handed off to the remote access server for transmission. In other embodiments, the request may be generated by the remote access server based on user selections made on the remote access user device. In still other embodiments, a hybrid approach may be used in which the remote access user device generates a request based on user inputs (e.g., start time and channel) and sends the request to a remote access server, which adds additional identifying metadata to the action request.

In some embodiments, the action request may be transmitted to the in-home user equipment. In such embodiments, the interactive media guidance application on the user equipment may match scheduling information included in the request with its own scheduling information obtained from the media service provider to determine the corresponding program for which to schedule the requested action. In other embodiments, the action request is transmitted to a media guidance access server of a media service provider for the interactive media guidance application for subsequent transmission to the user equipment. In these embodiments, the media guidance access server may at least store the action request prior to or after transmission to the user equipment. In any of the aforementioned approaches, the application running on the remote access server may be an interactive media guidance application such as an interactive program guide.

In response to receiving the action request, the interactive media guidance application on the user equipment may locate, in its media guidance data source for the media service provider, the corresponding program information for the scheduling information included in the action request. For example, if the action request included a channel and a start-time, but not a specific program identifier (such as a program title), the interactive media guidance application may locate the corresponding program title for that channel and start time. If located, the corresponding program information may be transmitted to the remote access server in an acknowledgement that may be sent by the interactive media guidance application. The remote access server may compare the program information included in the acknowledgement with the corresponding program information for the remote access server to detect disparities. For example, the remote access server may compare the program title received from the interactive media guidance application with its program title for the scheduling information included in the action request to detect any disparities in program information. The remote access server may also determine a disparity based on other program information besides the program title, such as series rating, series information, episode title, and media service provider.

If a disparity exists between the program information used by the remote access, server and that used by the interactive media guidance application on the user equipment, any of several techniques may be used, in combination or in isolation, to ensure the requested action is scheduled for the correct program. These techniques may include searching the program information database(s) of the interactive media guidance application for alternate scheduling information for the program. In some embodiments, the remote access server may transmit a search request (e.g., SQL-type query) to a media guidance access server which may run the search against one or more media guidance data sources used by the interactive media guidance application. For example, if a user of the remote access user device had selected scheduling information for an episode of "The Crocodile Hunter," but the acknowledgement from the interactive media guidance application on the user equipment included program information for an episode of "Sex and, the City," the remote access server may transmit a search request for searching the media guidance data source(s) of the interactive media guidance application for alternate scheduling information for episodes of "The Crocodile Hunter." By sending queries to the media guidance access server only when disparities are detected, the interactive media system may minimize the costs of such search requests to processing and communication bandwidths, and overall system performance. For the typical media guidance data source, querying the substantial program information hosted thereon may take several days to weeks depending on processing speed and processor priority accorded the query. Therefore, frequent queries to the media guidance access server, while possibly improving the accuracy of scheduling information included in initial action requests, may lead to unacceptably slow system response times.

In other embodiments, the remote access server may bypass the media guidance access server and run the query against the media guidance data source using, for example, a remote access connection. Here too, although the remote access server may have direct access to the media guidance data source, it may advantageously generate initial action requests based on program information provided by a data provider to the remote access service to save processing and communication bandwidths on the media guidance data source.

The search for alternate scheduling information may include any number of additional program information, including but not limited to, program title, series identifier, program rating, standard/high definition indicator, episode title, and any combination of these properties.

Complex, flexible matching algorithms that may support exact match techniques and/or partial or "fuzzy" matching logic (e.g., searching for a closest match) may be used to locate alternate scheduling information for the original program selected by the user. For example, program information associated with programs may be compared to program information (e.g., title) for the original program selected by the user. Based on the degree of similarity between the program information for a program and the program information for the original program selected by the user; a "similarity rating" may be assigned to the program information using any suitable algorithm or weighting logic. For example, a substantial similarity between program titles may be weighted more heavily in the similarity rating algorithm than an exact match between program rating information. Program information for a plurality of channels associated with the interactive media guidance application on the user equipment may be searched. Searching for alternate scheduling information may involve searching alternate scheduling information from a plurality of media service providers, whether that information is stored in one database or a plurality of databases. For example, searching for alternate scheduling information may involve searching a plurality of databases for the interactive media guidance application, in which each database is associated with a different media service provider.

If satisfactory alternate scheduling information is found, the remote access user device or the remote access server may transmit the alternate scheduling information to the user equipment (or to a the media guidance access server of the media service provider for subsequent transmission to the interactive media guidance application). In some embodiments, alternate scheduling information for one or more channels having similarity ratings that satisfy a predetermined minimum similarity criterion may be transmitted. In some embodiments, the program information for all channels that satisfy the predetermined minimum criterion may be transmitted. In other embodiments, the program information for only the channel with the highest similarity rating may be transmitted. In still other embodiments, up to a predetermined number of program information for channels with highest similarity ratings may be transmitted.

In some embodiments, steps may be taken to correct the program information used by the remote access server upon detecting a disparity between the program information used by the remote access server and the program information used by the interactive media guidance application on the user equipment. For example, a disparity may be the result of the remote access server and the interactive media guidance application on the user equipment using different databases for program listings. In some cases; the same channel may use a "PBS" source during daytime and a "TNT" source at nighttime. However, the remote access server may only have the capability to associate each channel with only one source, making it necessary for the remote access server to "switch" sources when a disparity is detected. In response to detecting a disparity between the source information on the remote access server and the source information of the interactive media guidance application on the user equipment, the remote access server may transmit a request to the user equipment or the media guidance access server of a media service provider for the interactive media guidance application for corrected program information for the source. Alternatively, the remote access server may directly search the media guidance data source of the interactive media guidance application. The remote access server may subsequently correct its program information database(s). In some embodiments, the remote access server may search for alternate scheduling information based on the corrected program information.

The remote access server may save information regarding disparities and use this information to improve the accuracy of future requests made to the same geographical area, or other similar interactive media guidance applications that use program information from the same media guidance data source. In some embodiments, the remote access server may maintain a lookup table that cross-references program identification information used by the remote access server with that of various media service providers. The remote access server may construct the lookup table based on past responses received from the interactive media guidance application for action requests. Additionally or alternatively, the remote access server may construct the lookup table based on outside information received from data providers for the media service provider. In these embodiments, when the action request is transmitted to the interactive media guidance application on the user equipment, the program for which the action is requested may be identified using program identification information for the media service provider. The request may additionally or alternatively include the appropriate scheduling information for the media service provider selected by the user.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 5-7 are illustrative web-based remote access service screens in accordance with one embodiment of the invention;

FIG. 11A shows an illustrative lookup table for cross-referencing source identification information between the remote access service provider and media service providers.

FIG. 11B shows an illustrative lookup table for cross-referencing program identification information between the remote access service provider and media service providers.

DETAILED DESCRIPTION OF THE DISCLOSURE

Figure 1:
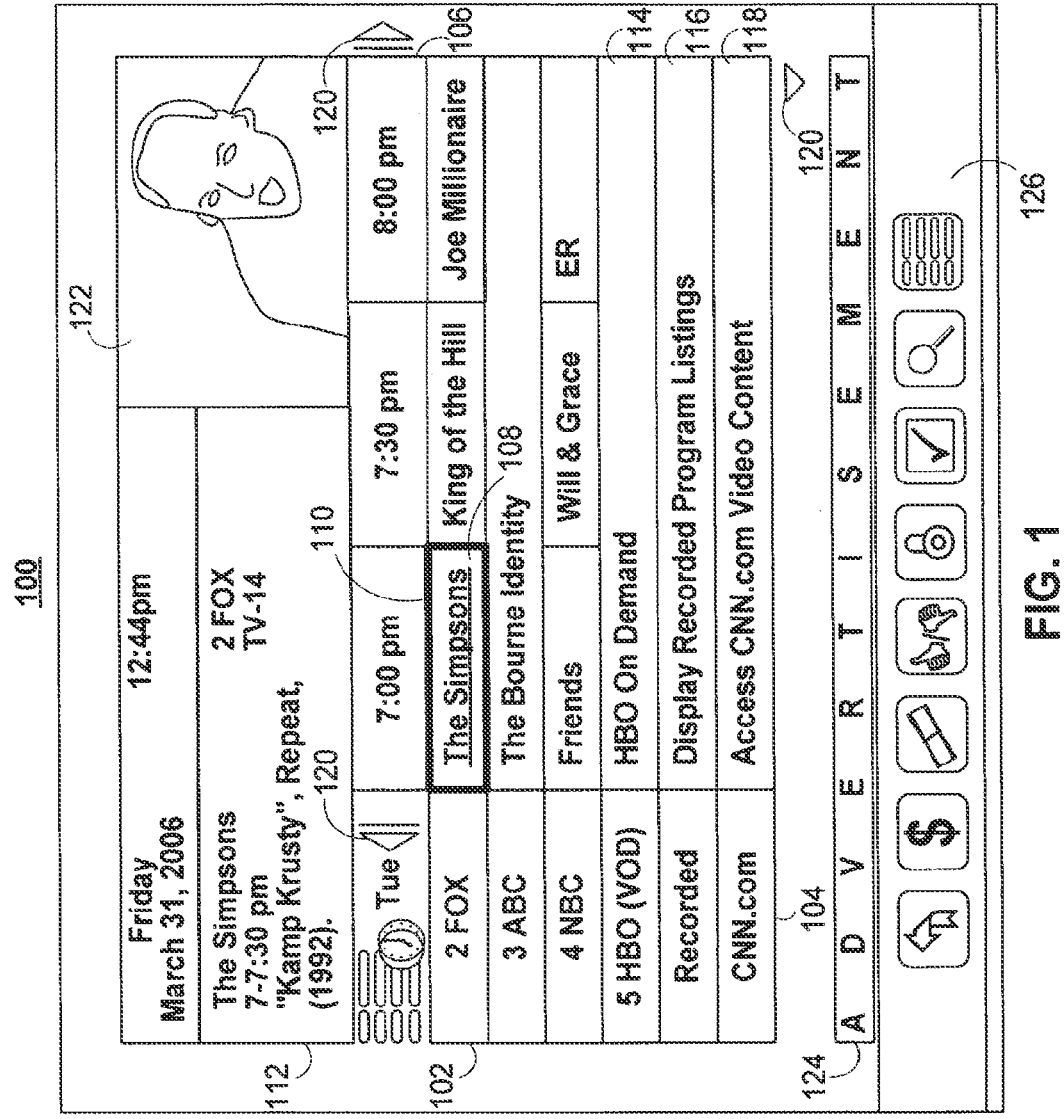
FIGS. 1 and 2 show illustrative display screens that may be used to provide media guidance application listings in accordance with one embodiment of the invention.

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable; satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices as well. The guidance provided may be for media content available only through a television, for media content available only through one or more of these devices, or for media content available both through a television and one or more of these devices. The media guidance applications may be provided as online applications (i.e., provided on a web-site), or as stand-alone applications or clients on hand-held computers, PDAs, mobile telephones, or other mobile devices. The various devices and platforms that may implement media guidance applications are described in more detail below.

One of the functions of the media guidance application is to provide media listings and media information to users. FIGS. 1, 2, and 5-7 show illustrative display screens that may be used to provide media guidance, and in particular media listings. The display screens shown in FIGS. 1, 2, and 5-7 may be implemented on any suitable device or platform. While the displays of FIGS. 1, 2, and 5-7 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media; downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND, THE SOPRANOS, and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred tows a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles, that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Figure 2:
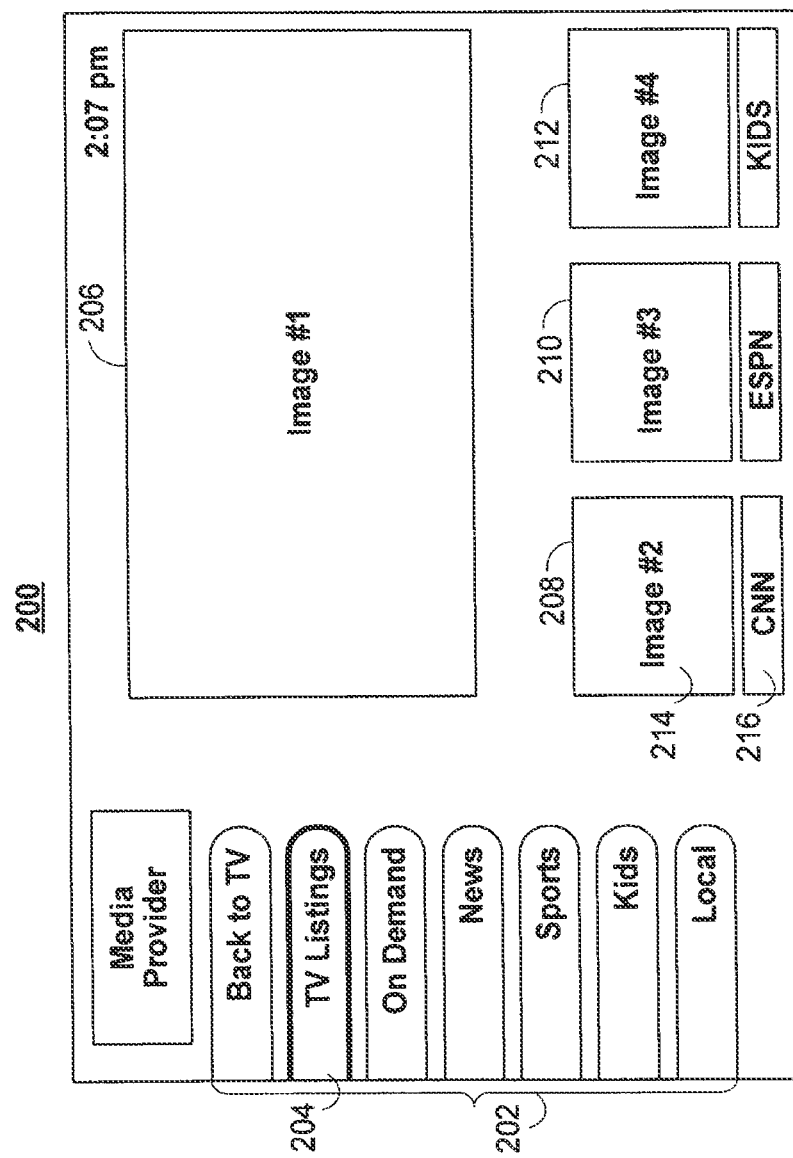

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
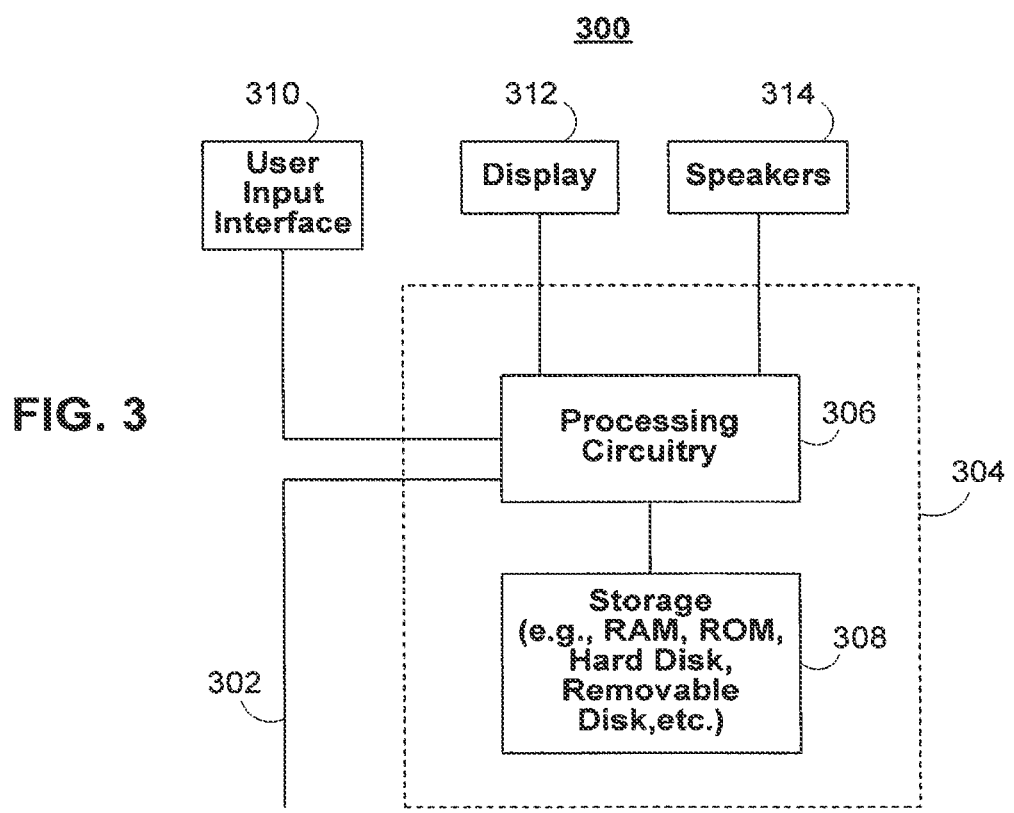
FIG. 3 shows an illustrative user equipment device in accordance with one embodiment of the invention.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

Figure 4:
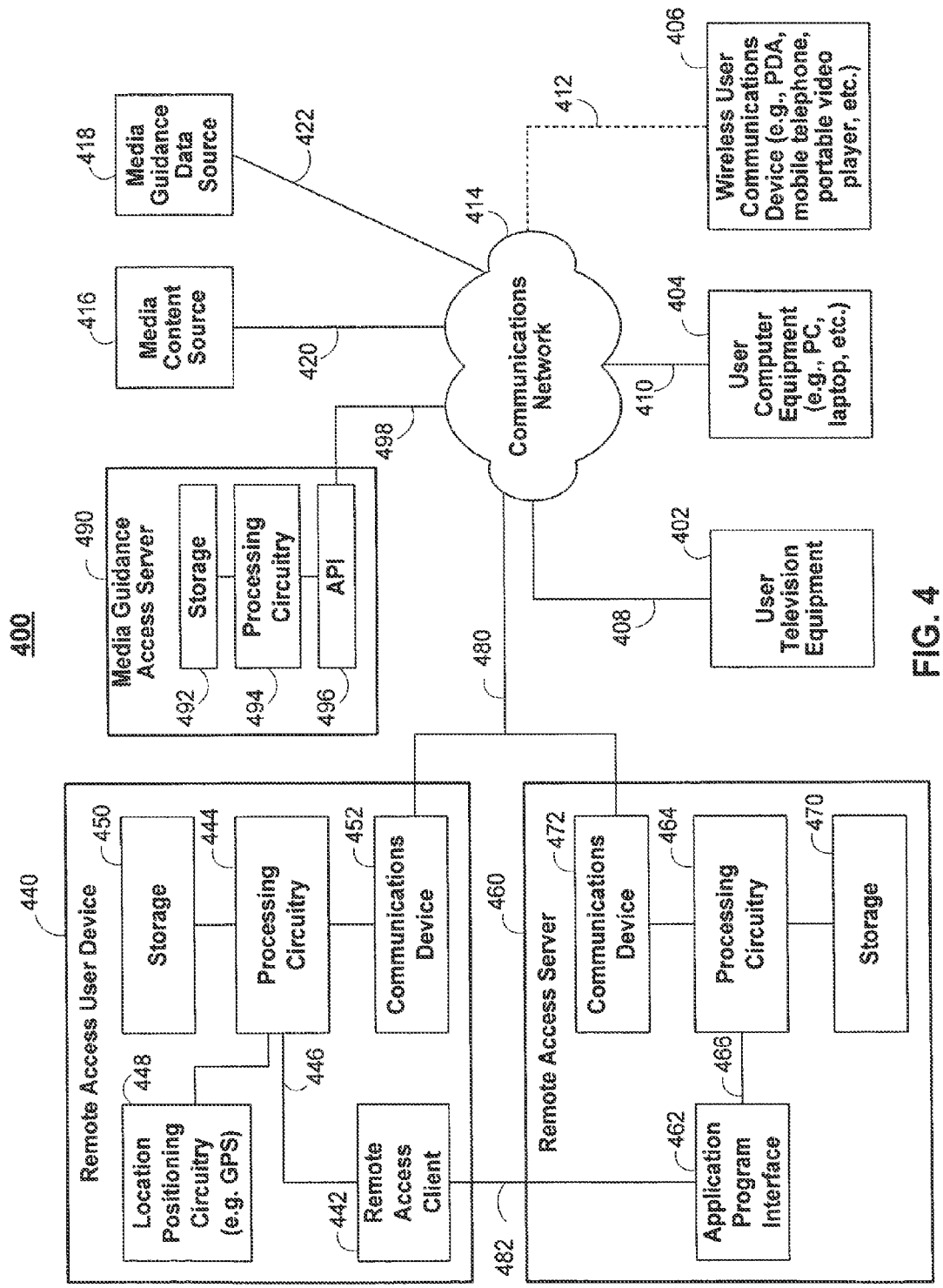
FIG. 4 is a diagram of an illustrative cross-platform interactive media system in accordance with one embodiment of the invention.

User equipment device 300 of FIG. 3 can be implemented in system 400 of FIG. 4 as user television equipment 402, user computer equipment 404, wireless user communications device 406, remote access user device 440, or any other type of user equipment suitable for accessing media (e.g., a non-portable gaming machine). For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below. The remote access user device 440 may also be any of the wireless user devices 406 (e.g., a PDA, mobile telephone, portable video player, etc).

System 400 is a simplified illustrative cross-platform interactive media system for providing remote access to interactive media guidance applications in accordance with one embodiment of the present invention. This exemplary system comprises remote access user device 440, remote access server 460, media service provider's remote access server 490, user equipment devices 402, 404, and 406, media content source 416, and media guidance data content source 418 as well as various communication networks and data links. In this exemplary figure, interactive media system 400 may host the media guidance application that a user of remote access user device 440 may wish to manage remotely through use of remote access server 460 and remote access user device 440.

In interactive media system 400, user television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In interactive media system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites; programming preferences that the guidance application utilizes to make programming recommendations; display preferences, and other desirable guidance settings. For example, if a user sets a channel as a favorite on, for example, the web site www.tvguide.com on their personal computer at their office using, say, remote access user device 440, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

In interactive media system 400, the user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a trademark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a trademark owned by Bluetooth SIG, INC. The user equipment devices may also communicate with each other directly through an indirect path via communications network 414.

Interactive media system 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 (FIG. 3) of user equipment device 300 (FIG. 3) and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance within a home network or over a media service provider network. Media guidance system 400 may be applied in any one or a subset of these approaches, or in a system employing other approaches for delivering media and providing media guidance.

In one approach, user equipment devices 402, 404, and 406 may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/175,410, filed Jul. 11, 2005. Different types of user equipment devices in a home network may also communicate with each other to transmit media content. For example, a user may transmit media content from user computer equipment to a portable video player or portable music player.

In another approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

In another approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In one embodiment of the present invention, users may remotely access and manage settings for interactive guidance applications implemented on user equipment devices 402, 404, and/or 406 using any suitable remote access user devices. Remote access user device 440 of system 400 shows a simplified illustrative embodiment of a remote access user device. More specific embodiments of remote access user device 440 are described below. In some embodiments, remote access user device 440 is a standard user device and may include a PC, a laptop, a tablet, a personal digital assistant (PDA), a mobile telephone, a portable video player, a portable music player, a portable gaming machine, a handheld computer, a portable television system, an automobile television system, other computer equipment, other wireless device, or other mobile user device having location positioning functionality. Remote access user device 440 may be a user device outside the user's home network (e.g., office computer) or any of user equipment device 406 within the user's home network.

Remote access user device 440 may include one or more of processing circuitry 444, storage 450, communications device 452, and remote access client 442 (which is actually an application run by processing circuitry 444 and stored on storage 450, but has been drawn as a separate element for clarity). Processing circuitry 444 may include all the features and components of processing circuitry 306 in FIG. 3. Storage 450, which is coupled to processing circuitry 444, may include memory (e.g., random-access memory, read-only memory, flash memory, or any other suitable memory), hard drives, optical drives, or any other suitable fixed or removable storage devices (e.g., floppy disk, CD, DVD, cassette, or any suitable recording or storage device).

Remote access user device 440 may also include location positioning circuitry 448 coupled to processing circuitry 444. Location positioning circuitry 448 may provide location positioning functionality through, for example, a global positioning system (GPS), or any other suitable means. Location positioning circuitry 448 may supply processing circuitry 444 with the current location of the user, which may determine which of a plurality of remote access servers 460 remote access user device 440 may communicate with. The current location of the user may also determine the source of program information provided by remote access server 460 to remote access user device 440.

Remote access user device 440 may also include one or more communications device 452. Communications device 452 may be any device suitable for supporting communications between remote access user device 440, remote access server 460 and communications network 480, such as a communication port (e.g., a serial port, parallel port, universal serial bus (USB) port, etc.), modem (e.g., any suitable analog or digital standard modem or cellular modem), network interface card (e.g., an Ethernet card, token ring card, etc.), wireless transceiver (e.g., an infrared, radio, or other suitable analog or digital transceiver), or other suitable communications device.

Communication between remote access user device 440 and remote access server 460 may take place over communications path 482 and/or via communications network 480 using communications device 452. Communications path 482 may include any of the communication paths described above in connection with paths 408, 410, and 412.

Communications path 482 may include any suitable transmission medium. For example, communications path 482 may include a serial or parallel cable, a dial-up telephone line, a computer network or Internet link (e.g., 10Base2, 10Base 5, 10BaseT, 100BaseT, 10BaseF, T1, T3, etc.), an in-home network link, an infrared link, a radio frequency link, a satellite link, any other suitable transmission link or suitable combination of such links. Any suitable transmission or access scheme may be used such as standard serial or parallel communications, Ethernet, Token Ring, Fiber Distributed Data Interface (FDDI), Circuit-Switched Cellular (CSC), Cellular Digital Packet Data (CDPD), RAM mobile data, Global System for Mobile communications (GSM), time division multiple access (TDMA), code division multiple access (CDMA), any other suitable transmission or access scheme, or any suitable combination thereof. Preferably remote access link 482 is bidirectional. If desired, however, certain limited program guide functions may be accessed using a unidirectional link. An advantage of using a unidirectional scheme for link 482 is that such schemes are generally less complicated and less expensive than bidirectional links.

Remote access user device 440 and remote access server 460 may communicate over communication path 482 using any suitable network and transport layer protocols, if desired. Remote access user device 440 and remote access server 460 may communicate, for example, using a protocol stack which includes Sequenced Packet Exchange/Internetwork Packet Exchange (SPX/IPX) layers, Transmission Control Protocol/Internet Protocol (TCP/IP) layers, Appletalk Transaction Protocol/Datagram Delivery Protocol (ATP/DDP) layers, or any other suitable network and transport layer protocols or combination of protocols.

Remote access user device 440 may include remote access client 442 for communicating requests to and receiving responses from remote access server 460. It should be noted that remote access client 442 is actually an application run by processing circuitry 444 and stored on storage 450, but has been drawn as a separate element for clarity. Remote access client 442, may be accessed by users using one or more user input interfaces (not shown). Any suitable user input interface may be used to access remote access client 442, such as those described in connection with user input interface 310 of FIG. 3. Remote access client 442 may communicate with application program interface (API) 462 of remote server 460 using any suitable communications scheme. In addition to using any of the already mentioned protocols, any number of other access, data-link, network, routing or other protocols may be involved in supporting communications between remote program guide access device 440 and remote access server 460 over remote access link 482 and communications network 480 (e.g., X.25, Frame Relay, Asynchronous Transfer Mode (ATM), Serial Line Interface (SLIP), point-to-point protocols (PPP), or any other suitable access, data-link, network, routing or other protocol).

It should be noted that communications between remote access user device 440 and remote access server 460 may occur over one or more communications paths, but are shown as a single path in FIG. 4 to avoid overcomplicating the drawing. In addition, there may be more than one of remote access user device 440, but only one of each is shown in FIG. 4 to avoid overcomplicating the drawing. Although communication between remote access user device 440 and remote access server 460 is shown as direct communications path 482, in some embodiments, remote access user device 440 may communicate with remote access server 460 through intermediate devices (not shown) such as those described above in connection with paths between media content source 416 and media guidance data source 418, and user equipment 402, 404, and 406. Remote access server 460 may also run on an intermediate server, such as a web server.

Remote access server 460 of media guidance system 400 is a simplified illustrative embodiment of a remote access server that may be used in accordance with the principles of this invention. Remote access server 460 may include one or more processing circuitry 464, storage 470, communications device 472, and application program interface (API) 462 (which is actually an application run by processing circuitry 464 and stored on storage 470, but has been drawn as a separate element for clarity). Remote access server 460 may be any suitable combination of hardware and software capable of client-server based interactions with remote access user device 440. Remote access server 460 may, for example, receive user requests from remote access user device 440 and generate action requests to be transmitted for processing. In some embodiments, remote access server 460 may run a suitable database engine, such as a SQL server or Oracle DB, and provide program guide data in response to queries generated by remote access user device 440. Processing circuitry 464 may include any suitable processor, such as a microprocessor or group of microprocessors, and other processing circuitry such as caching circuitry, direct memory access (DMA) circuitry, and input/output (I/O) circuitry. Storage 470 may include any suitable storage device including memory or other storage devices, such as random access memory (RAM), read only memory (ROM), flash memory, and a hard disk drive, that is suitable for storing the program guide data to be used by the remote access server. Program guide data may be stored on storage device 470 in any suitable format (e.g., a Structured Query Language (SQL) database). Storage 470 may also store user profile information for correlating users with their respective user equipment devices. Storage 470 may included several levels of primary, secondary, and auxiliary storage. Although storage 470 is shown in direct connection with processing circuitry 464, in some embodiments, at least a portion or all of storage 470 may be located on a separate data server remote from remote access server 470. Communications device 472 may be any suitable communications device such as those described in connection with communications device 452. Media guidance system 400 may include multiple remote access servers 460. However, only one is shown to avoid overcomplicating the drawing.

Media guidance access server 490 of media guidance system 400 is a simplified illustrative embodiment of an access server for a media service provider of media guidance system 400 that may be used in accordance with the principles of this invention. Media guidance access server 490 may include one or more processing circuitry 494, storage 492, communications device (not shown), and application program interface (API) 496 (which is actually an application run by processing circuitry 494 and stored on storage 492, but has been drawn as a separate element for clarity). Media guidance access server 490 may be any suitable combination of hardware and software capable of interactions with media guidance data source 418, user equipment devices 402, 404, and 406, and remote access server 460. Media guidance access server 490 may, for example, receive user requests from remote access server 460 for subsequent transmission to user equipment devices 402, 404, and/or 406 for processing. In some embodiments, media guidance access server 490 may run a suitable database engine, such as a SQL server or Oracle DB, and provide program guide data in response to queries generated by remote access server 460. Processing circuitry 494 may include any suitable processor, such as a microprocessor or group of microprocessors, and other processing circuitry such as caching circuitry, direct memory access (DMA) circuitry, and input/output (I/O) circuitry.

Storage 492 may include any suitable storage device including memory or other storage devices, such as random access memory (RAM), read only memory (ROM), flash memory, and a hard disk drive, that is suitable for storing data. In a typical usage scenario, media guidance access server 490 obtains media guidance data from media guidance data source 418. In some embodiments, media guidance access server 490 may store or cache the media guidance data obtained from media guidance data source 418 on storage device 492 in any suitable format (e.g., a Structured Query Language (SQL) database). Storage 492 may also store action requests received from remote access server 460. Storage 492 may included several levels of primary, secondary, and auxiliary storage. Although storage 492 is shown in direct connection with processing circuitry 494, in some embodiments, at least a portion or all of storage 492 may be located on a separate data server remote from media guidance access server 490. Media guidance access server 490 may also include communications device (not shown) that may be any suitable communications device such as those described in connection with communications device 452. Media guidance system 400 may include multiple media guidance access servers 490. However, only one is shown to avoid overcomplicating the drawing.

Cross-platform media guidance system 400 is intended to illustrate a number of approaches, or network configurations, by which user equipment devices, sources of media content and guidance data, and remote access service providers may communicate with each other for the purpose of providing remote access to media guidance applications. The present invention may be applied in any one or a subset of these approaches, or in a system employing other approaches for delivering media and providing media guidance.

In one illustrative usage scenario, a user at remote access user device 440 authenticates with remote access client 442. Using the remote access client 442, the user may select a program to be recorded on the user's in-home user equipment. For example, in FIG. 5 (which will be described in more detail below), a user may select "The Crocodile Hunter," on channel 100; starting at 2:00 PM to be recorded on the user equipment. After the user confirms the selection on FIG. 7A (which will be described in more detail below), the remote access user device 440 or the remote access server 460, may generate a request to be transmitted, either directly or through intermediate devices, for processing by the interactive media guidance application on user equipment 402, 404, or 406 (all of FIG. 4).

Figure 5:
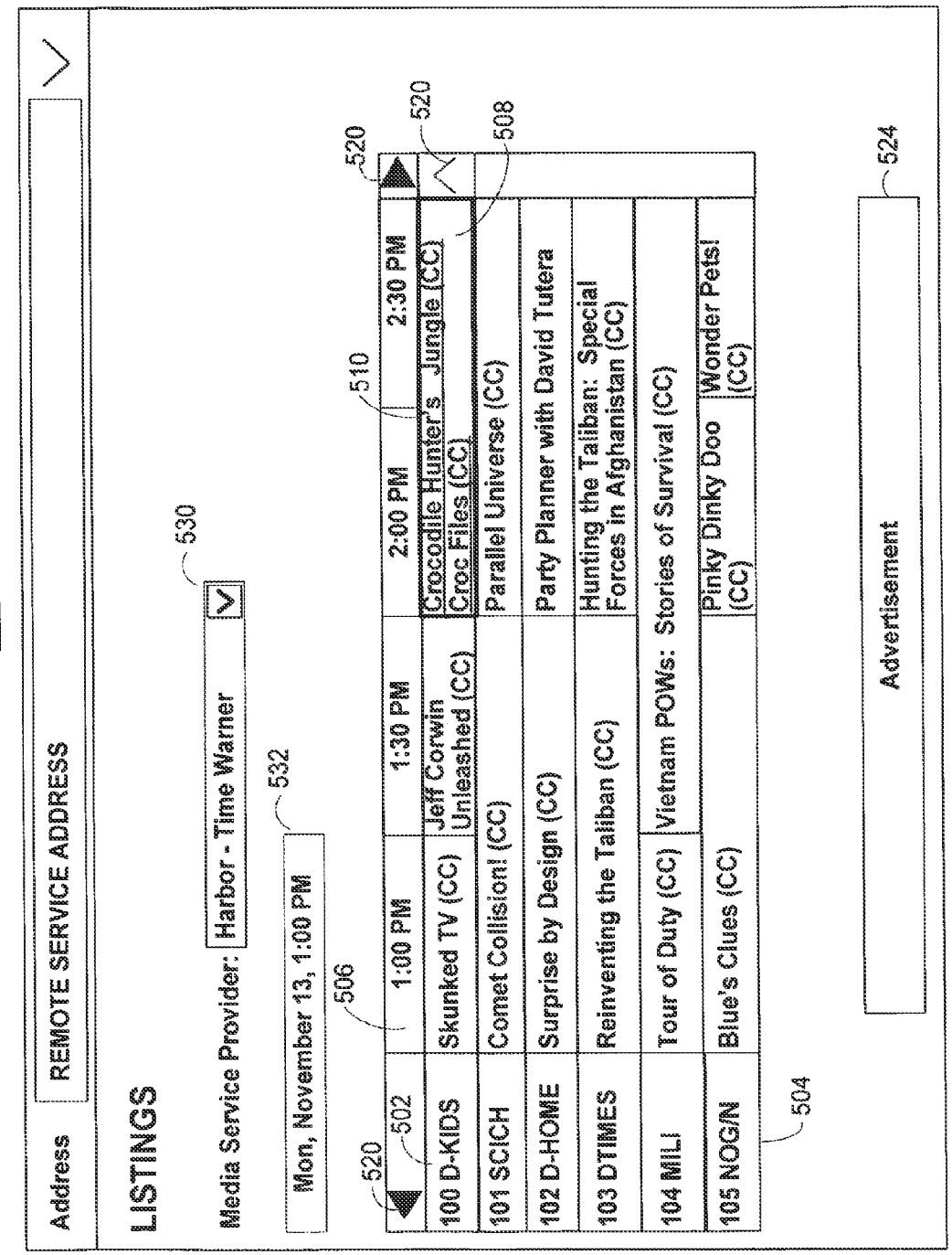

FIG. 5 shows illustrative grid program listings display 500 that may be included in an exemplary implementation of remote access client 442 described in connection with FIG. 4 in accordance with one embodiment of the invention. In some embodiments, a user enrollment process including one or more user enrollment screens (not shown) may be completed before accessing display 500 or any remote access functionality. In some embodiments, the interactive user enrollment process may also present a series of questions to the user relating to the user's viewing habits, viewing times, favorite programming, favorite actors, favorite series, or any other suitable information. The information collected via the user enrollment process may be stored as a user profile on the remote access server, remote access user device, user equipment devices, or at a remote location (e.g., any storage facility connected to communication network 480 of FIG. 4) and may be used to automatically recommend or advertise specific programs. In some embodiments, the remote access service may also actively monitor a user's viewing behavior and actions through remote access client 442 of FIG. 4. Information from this monitoring may be stored as part of the user's profile and may also be used to recommend or suggest programs.

Figure 6:
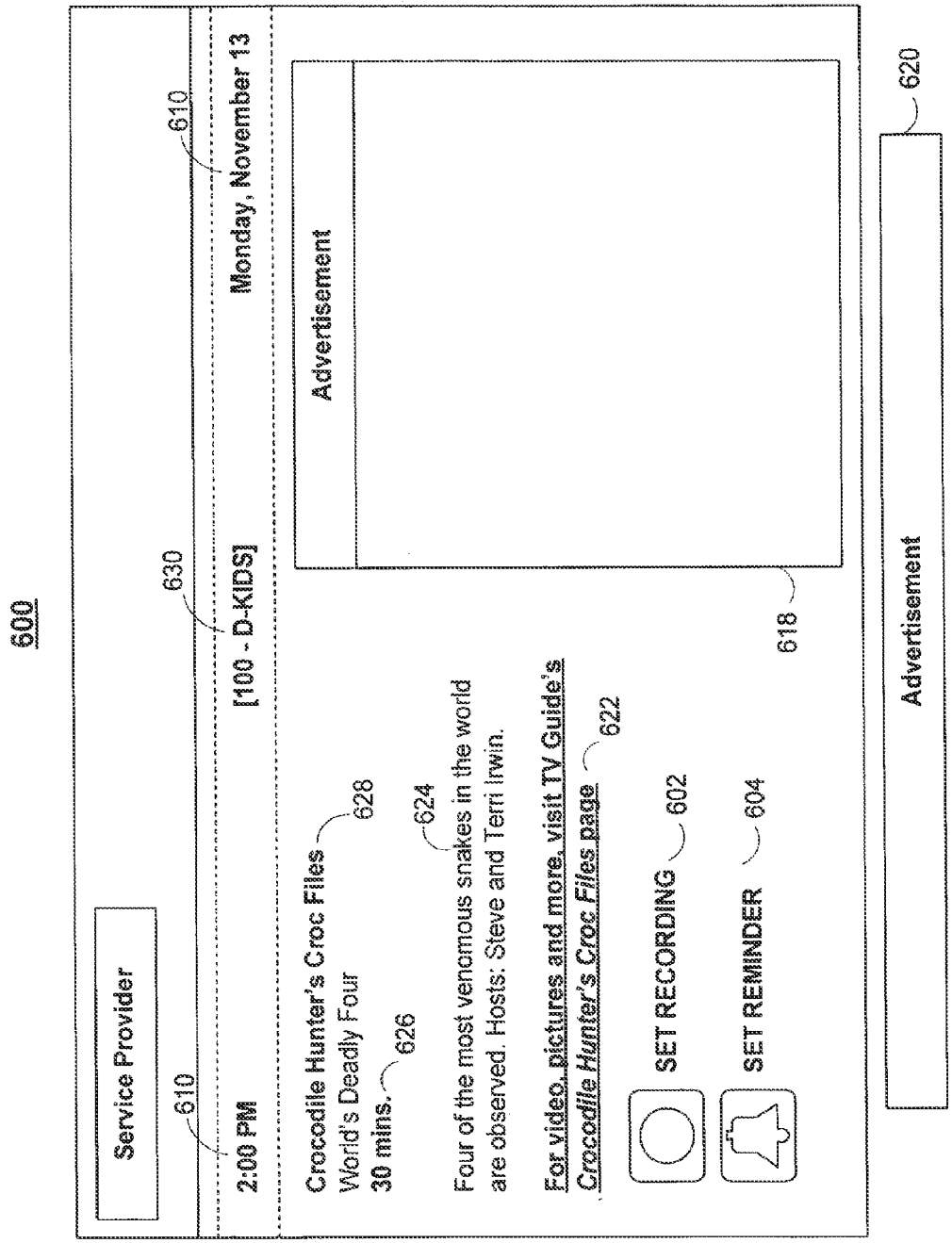

Each of the display screens in FIGS. 5-7 may include a number of banner advertisements 524 and panel advertisements (not shown). The size, shape, and location of the aforementioned advertisements may be altered without departing from the spirit of the invention, and more or less advertisements than those shown in FIGS. 5-7 may be displayed, if desired.

Display 500 may include program information arranged by time and channel for providing remote access to interactive guidance application functions on user equipment. Display 500 may include grid 502 with: (1) a column of channel/media type identifiers 504, where each channel/media type identifier (which is a cell in the column) identifies a different channel or media type available; and (2) a row of time identifiers 506, where each time identifier (which is a cell in the row) identifies a time block of programming. Grid 502 also includes cells of program listings, such as program listing 508, where each listing provides the title of the program provided on the listing's associated channel and time. Display 500 also includes drop-down box 530 which may be used to select the media service provider for the geographical location of the user equipment. In some embodiments, the media server provider selected may be stored in the user profile information and displayed during remote access sessions. Display 500 also includes date/time menu 532 that a user of remote access client 442 (FIG. 4) may change. The media service provider, and the date and time selected by the user determine the program information displayed in grid 502. With a user input device, a user may select program listings by moving highlight region 510 of grid 502.

FIG. 6 shows illustrative screen 600 for providing information relating to the program listing selected by highlight region 510 in FIG. 5. Screen 600 may include, for example, the program title 628, the program description 624, the starting time for the program 610, the channel on which the program is presented 630, the program's rating (not shown), and other desired program information, such as, for example access link 622. In some embodiments, screen 600 may also provide menu options for providing remote access to specific interactive guidance application functions.

For example, the user may select menu option 602 to remotely set up recording for the program on the in-home user equipment. FIG. 7A shows illustrative recording setup screen 700 that may be used by the user to remotely set up recording for the program according to one embodiment of the invention. Recording setup screen 700 may include, for example, the program title 702, the starting time 706, the channel 704, the program's duration 718, the program's rating (not shown), and other desired program information. In addition to displaying program information, screen 700 may also be used to define additional options for the recording. For example, the user may instruct the user equipment on which the recording is to be scheduled when to begin recording. Using drop-down box 712, the user may remotely instruct the interactive media guidance application to, for example, begin recording the program at it's scheduled start time or, alternatively, at some other user-determined time. Similarly, using drop-down box 714, the user may remotely instruct the user equipment to, for example, stop recording the program at it's scheduled stop time or, alternatively, at some other user-determined time. Using drop-down box 716, the user may also determine how long the user equipment may save the recorded program. The user may, for example, decide to save the recording until space is needed for new recordings or set a user-determined date when the recording may be removed or deleted by the user equipment. Although options 712 through 716 are depicted as drop-down boxes, any suitable input module may be used without departing from the spirit of the invention. For example, radio buttons may be used in one or more of options 712 through 716. After selecting and/or reviewing information for remotely setting up the recording, the use may confirm the recording or abort altogether. For example, the user may select menu item 710 to confirm the recording setup. Alternatively, the user may select menu item 720 to abort the recording setup. In some embodiments, the user may choose to save the recording setup on, for example, storage 470 of the remote access server for later confirmation or abandonment.

Returning to illustrative screen 600 in FIG. 6, the user may additionally or alternatively select menu option 604 to remotely set up a reminder for the program on the in-home user equipment. FIG. 7B shows illustrative reminder setup screen 750 that may be used by the user to remotely set up reminders for the program according to one embodiment of the invention. Reminder setup screen 750 may include, for example, the program title 752, the starting time 756, the channel 754, the program's duration 768, the program's rating (not shown), and other desired program information. In addition to displaying program information, screen 700 may also be used to define additional options for setting up the reminder. For example, the user may instruct the user equipment on which the reminder is to be scheduled when to display the reminder. Using menu item 762, the user may remotely instruct the user equipment to, for example, present the reminder for the program at it's scheduled start time or, alternatively, at some other user-determined time. Similarly, using menu item 764, the user may remotely instruct the user equipment to, for example, stop reminding the program at it's scheduled stop time or, alternatively, at some other user-determined time. Using menu item 766, the user may also determine how long the user equipment may keep the reminder active. The user may, for example, decide to keep the reminder active until the series completes its seasonal run, keep the reminder active for the specified episode only, or set a user-determined date when the reminder may be deactivated or deleted by the user equipment. After selecting and/or reviewing information for remotely setting up the reminder, the use may confirm the reminder or abort altogether. For example, the user may select menu item 760 to confirm the reminder setup. Alternatively, the user may select menu item 770 to abort the reminder setup. In some embodiments, the user may choose to save the reminder setup on, for example, storage 470 of the remote access server for later confirmation or abandonment.

After a user confirms a program action request, one or more action request definitions may be generated for the user's selection. For example, an action request definition may define the specific action that the user wishes to schedule (e.g., set up recording or set up reminder), the selected channel, selected start time, user client identification information, and any additional information that may be supported by the application program interface of the remote access server. The action request definition may be generated by remote access user device 440, remote access server 460 (both of FIG. 4), or by a hybrid approach in which the remote access user device generates a request based on user inputs (e.g., time and channel) and then sends the request to a remote access service which adds additional metadata (e.g., program identification information) to the request.

Figure 8A:
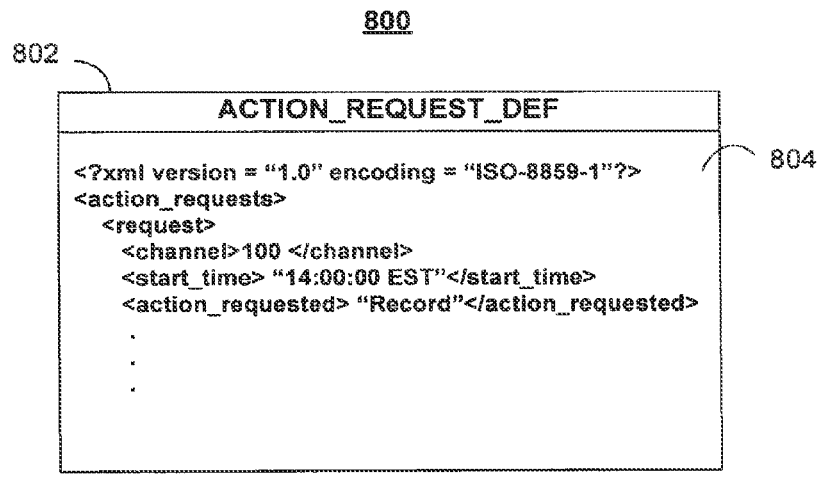
FIGS. 8A and 8B illustrate, respectively, program action request and response datasets.

As shown in FIG. 8A, XML tags may be used to define one or more action request definitions. Other suitable data structures may be used in other embodiments. XML file 800 includes file name 802, which may be used to uniquely identify the request. In some embodiments, name 802 includes a unique numeric descriptor. Tag data 804 may include XML tags that define program channel, action requested (e.g., set reminder or set recording), and the start time, for the program for which the action is requested. Program set definitions may additionally or alternatively include search criteria. This search criteria may define a search string to be executed on a media guidance application database or other content database which may receive the action request definition.

It should be noted that the application program interface (API) for most media guidance access servers 490 (FIG. 4) for media service providers (which may receive and store the action request) may not have the capability to receive other program-specific information such as a program title, a unique program identification, a program source name (e.g., "HBO"), or a unique identifier for the program source. As a result, the examples described herein may not include such program-specific information. However, where the API for the cable provider's server is capable of receiving additional program information, the action request definition generated for the user request may include this additional information without departing from the spirit of the invention.

The action request definition may be transmitted to be processed by the user equipment. In some embodiments, the action request may be received from the remote access server by the user equipment (e.g., user equipment devices 402, 404, and/or 406 in FIG. 4). The user equipment may process the request using program information from, for example, media guidance data source 418 (FIG. 4). In other embodiments, the action request may be received from the remote access server by a cable provider's remote service server which then subsequently transmits the request to the interactive media guidance application. In some embodiments, the cable provider may store and monitor information relating to the request for further analysis.

In some embodiments, the user equipment or a service provider for the user equipment may send an acknowledgement to the remote access server upon receiving the action request. The acknowledgement may include information previously included in the action request definition and additional program information relating to the actual program against which the requested action is to be performed, such as the program title.

Figure 8B:
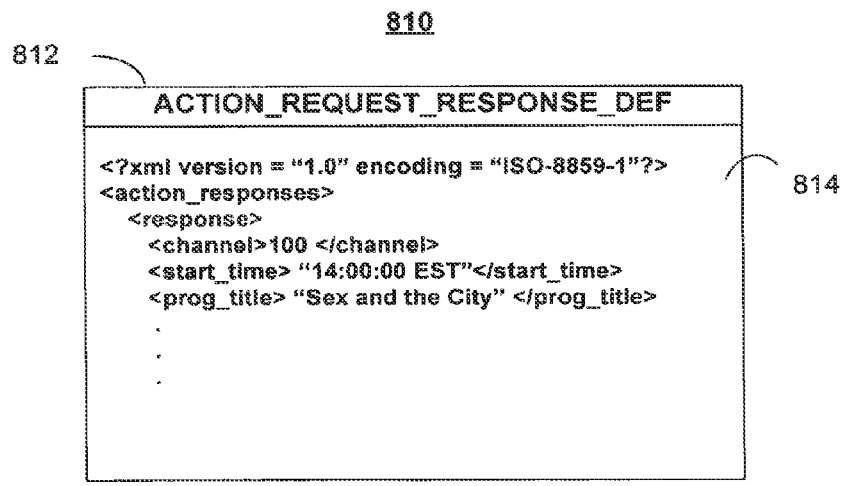

FIG. 8B shows illustrative action request acknowledgement that may be transmitted by the user equipment or a service provider for the user equipment to the remote access server. As shown in FIG. 8B, XML file 810 may include file name 812, which may be used to uniquely identify the action request confirmation. Tag data 814 may include XML tags that define the program title, channel, and start time for the program for which the requested action may have been scheduled. Upon receiving XML file 810, the remote access server may compare additional information contained in the file with the corresponding information in the remote access program information databases to detect if the wrong program may have been recorded. For example, in screen 700 (FIG. 7A) the user intended to record an episode of "The Crocodile Hunter." However, XML file 810 includes program title information indicating that the program "Sex and the City" was scheduled to be recorded. The remote access server may use the disparity in title information to detect that the wrong program may have been scheduled to be recorded and take steps to schedule a recording for the correct program.

Figure 9A:
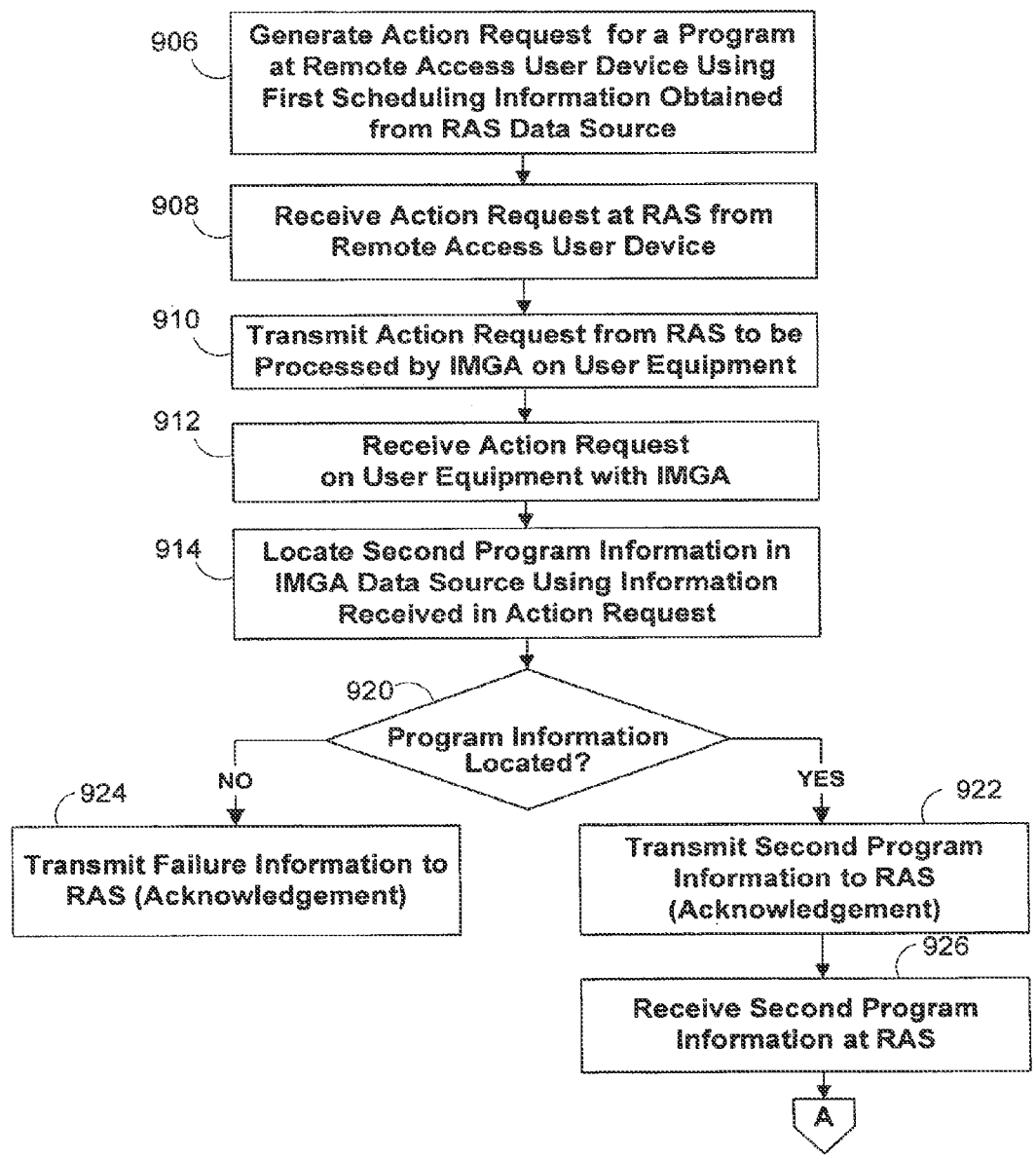
FIGS. 9, 10, 12, and 13 are illustrative process flowcharts of steps involved in providing remote access to interactive media guidance applications according to various embodiments of the invention.
Figure 9B:
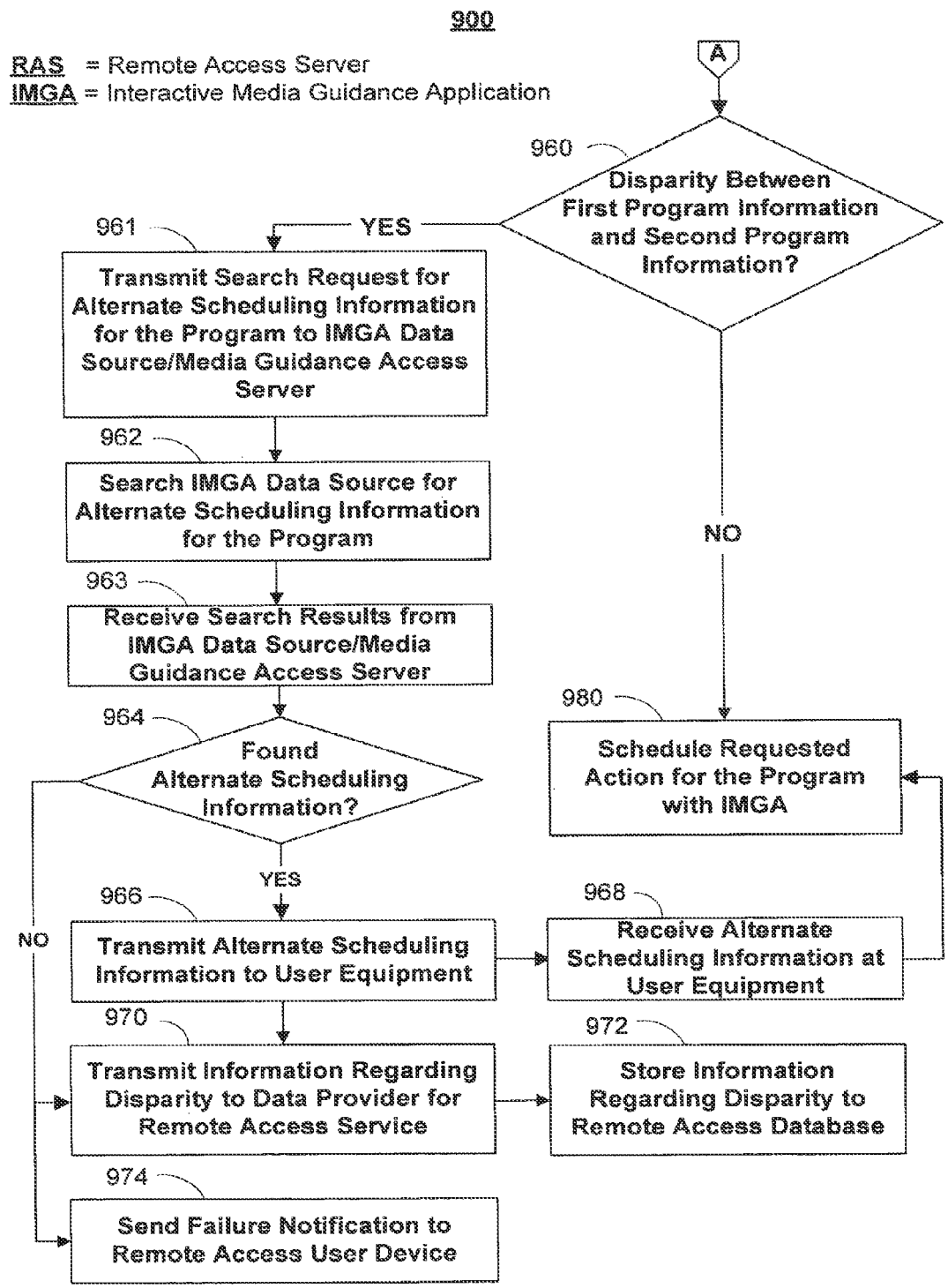

FIGS. 9A and 9B collectively show illustrative process 900 for remotely scheduling an action request with interactive media guidance applications on user equipment according to one embodiment of the invention. A user wishing to remotely access interactive media guidance application on user equipment may begin a remote access request by, for example, providing identification information to remote access client 442 for authenticating with the remote access server 460. In some embodiments, access to remote access server 460 may be restricted to subscribers who may or may not pay a subscription fee. Using a remote access client 442 (e.g., displays in FIGS. 5-7), the user may specify parameters for the action request.

At step 906, an action request is generated for the program selected by the user. In some embodiments, the action request may be completely generated by remote access user device 440 and passed on to remote access server 460 for transmission. In other embodiments, remote access user device 440 and remote access server 460 may each generate a portion of the action request. For example, remote access user device 440 may generate an action request including user-determined parameters and pass it off to remote access server 460 which may supplement the action request with additional routing or identifying information for subsequent transmission. The program scheduling information used to generate the action request may be obtained from program listings information stored on storage 470 of the remote server or from a data cache included in storage 450 of remote access user device 440. The scheduling information may be obtained from a data provider for the remote access service (hereinafter referred to as "remote access data") and may not correspond to the program listings information used by the interactive media guidance application implemented on user equipment 402, 404, and/or 406 (all of FIG. 4). The action request including remote access data may be transmitted using, for example, XML file 800 in FIG. 8A for processing. The program information used by the user equipment devices will hereinafter be referred to as "local guide data." In some embodiments, local guide data, while used by the interactive media guidance application, may be retrieved by the media guidance access server or the cable/satellite/media service provider and passed through to remote access server 460 (FIG. 4) for inclusion in XML file 800.

At step 908, the action request is received by remote access server 460 from the remote access user device 440. The action request may be communicated from remote access client 442 to remote access server application program interface 462 over communication path 482 (all of FIG. 4) using any suitable communication protocol.

At step 910, remote access server 460 transmits the action request to the interactive media guidance application on the user equipment (e.g., 402, 404, and/or 406 of FIG. 4) for scheduling the requested action. The action request may include general criteria for locating the actual program (e.g., start time and channel). In some embodiments, the remote access server may transmit the action request to a media guidance access server 490 (FIG. 4) of a media service provider of the interactive media guidance application on the user equipment for subsequent transmission to the user equipment. The action request may include program-specific identification for the program (e.g., program title and/or episode title) in cases where the API of media guidance access server 490 (FIG. 4) is capable of receiving such information. The action request may be transmitted to the user equipment from the remote access server.

At step 912, the action request is received on the user equipment. The action request may be received from remote access server 460 (FIG. 4) or through an intermediate server such as media guidance access server 490 (FIG. 4) for the media service provider of the interactive media guidance application. The process continues to step 914.

At step 914, the interactive media guidance application locates, in the media guidance information (e.g., media guidance data source 418 of FIG. 4) provided by a media service provider, the corresponding program information for which the requested action will be scheduled. The corresponding program information is located based on scheduling information received in the action request. In some embodiments, the received action request may include, for example, the start time and the channel for the program for which the action is requested without including the actual program identifier. The program identifier for the corresponding program may be located by the interactive media guidance application on the user equipment or by the media service provider for the interactive media guidance application and passed through to the interactive media guidance application on the user equipment. The search for the corresponding program information may be controlled by processor 300 (FIG. 3) in user equipment devices 402, 404, and/or 406 (all of FIG. 4) or any other processor associated with the interactive media guidance application. In some embodiments the received action request may include the appropriate program identifier for the media service provider of the interactive media guidance application. These embodiments will be described in detail below in connection with FIG. 10.

At step 920, a determination is made whether program information corresponding to the scheduling information included in the action request has been located in media guidance data source 418 (FIG. 4). If the interactive media guidance application is unable to locate the corresponding program information, an acknowledge may be transmitted to the remote access server at step 924 to indicate that the requested action was not scheduled. If the interactive media guidance application is able to locate the corresponding program information, the process continues to step 922.

At step 922, the corresponding program information from the local guide data (e.g., channel, start time, and program title) is transmitted to the remote access server in an acknowledgment from the interactive media guidance application on the user equipment. For example, XML file 810 may be transmitted to the remote access server in acknowledgement to the action request received at step 912. The interactive media guidance application may transmit the acknowledgement to the remote access service without first scheduling the requested action on the user equipment. In these embodiments, the action request may be stored on media guidance access server 490 (FIG. 4) of a media service provider and/or on the user equipment (e.g., on storage 308 of processor 300 in 402, 404, and/or 406) while waiting for the remote access server to instruct the user equipment at step 980 (described in more detail below) to proceed to schedule the action based on the corresponding program information transmitted to the remote access server at step 922 above. The process continues to step 926.

At step 926, the acknowledgment is received by remote access server 460. The acknowledgement may be received through communications device 472 by any suitable means. In some embodiments, remote access server 460 may pass the acknowledgement on to remote access client 442 through communications path 482. In other embodiments, the acknowledgement may be alternatively (or additionally) received by remote access user device 440 through communications device 452 (all of FIG. 4) from the interactive media guidance application.

At step 960, using the program information included in the acknowledgment received from the interactive media guidance application, a determination is made whether a disparity exists between the program information for the program in remote access server 460 and the program information for the program in the local guide data used by the interactive media guidance application on user equipment 402, 404, and/or 406 (all of FIG. 4). This determination may be made by remote access user device 440 (FIG. 4) or by remote access server 460 (FIG. 4). For example, program title included in the acknowledgment in XML file 810 (FIG. 8B) may be compared with the corresponding program title in the remote access data. In the illustration presented in screen 700 (FIG. 7A) the user intended to schedule a recording of an episode of "The Crocodile Hunter" with the interactive media guidance application. However, when the selected channel and start time were transmitted to the interactive media guidance application in XML file 800 (FIG. 8A), the interactive media guidance application responded with acknowledgement XML file 810 (FIG. 8B) indicating that the program corresponding to the channel and start time was "Sex and the City." In this instance, the remote access server may compare the program title included in XML file 810 with the corresponding program title for the schedule in the remote access data to detect the disparity.

If no disparity is detected at step 960, the process continues to step 980 where the requested action is scheduled with the interactive media guidance application on the user equipment. The interactive media guidance application may schedule a recording, set up a reminder, or schedule some other program-specific action for the program located by the interactive media guidance application in step 920. Depending on the options contained in the action request, the interactive media guidance application may also schedule other actions related to the action request such as, for example, scheduling a future date for when the recorded program may be deleted from the user equipment.

If a disparity is detected at step 960, the process continues to step 961. At step 961, remote access server 460 transmits a search request for alternate scheduling information for the program to media guidance access server 490 and/or to media guidance data source 418 (all of FIG. 4). The search request may include a SQL-based query for program information meeting certain criteria. For example, in the illustration discussed above in connection with step 960, the search request may include a SQL-based query for all channel and start times associated with all programs whose program title contains the word "Crocodile."

At step 962, using the search request transmitted by the remote access server, a search may be performed on media guidance data source 418 (FIG. 4) for alternate scheduling information for the target program for which the user intended to schedule the action. The search may be performed on one or more media guidance data sources 418 for one or more media service providers. In addition to the program title, the search may consider additional program information such series identifier, program rating, standard/high definition indicator, episode title, and any combination of these properties.

Complex, flexible matching algorithms that may support exact match techniques and/or partial or "fuzzy" matching logic (e.g., searching for a closest match) may be used by the search to locate alternate scheduling information for the program. During the search, program information associated with programs on different channels may be compared to program information for the target program selected by the user. Based on the degree of similarity between the program information for a program and the target program selected by the user, a "similarity rating" may be assigned to that particular program for that channel. The similarity rating may be determined using any suitable algorithm or weighting logic. For example, a substantial similarity between program titles and/or episode titles may be weighted more heavily in the similarity rating algorithm than an exact match between program rating information. Program information for programs on a plurality of channels associated with media guidance data source 418 (FIG. 4) may be searched. Searching for alternate scheduling information may involve searching alternate scheduling information from a plurality of media service providers (e.g., cable service providers and satellite service providers), whether that information is stored in one database or a plurality of databases. For example, searching for alternate scheduling information may involve searching a plurality of databases for media guidance data source 418 (FIG. 4), in which each database is associated with a different media service provider. In some embodiments, remote access server 460 may have direct access to media guidance data source 418. In these embodiments, remote access server 460 may by-pass media guidance access server 490 and perform a search on media guidance data source 418 using a remote access connection. It should be noted that the similarity rating algorithms discussed above may occur at remote access server 460 (FIG. 4) after the initial search results are received from the media guidance access server at step 963 (described below). For example, the remote access server may request (at step 961) a "crude" set of program information that may potentially match the target program and refine this set to narrow it down to the closest matches. When the search is completed, the process continues to step 963.

At step 963, remote access server 460 receives the search results from media guidance access server 490 or alternatively from media guidance data source 418 (all of FIG. 4). The search result may include program information sets for all programs matching the search query. Alternatively, the remote access server and/or media guidance access server may set a maximum number of program information sets to be returned in the results. In some embodiments, the results may include additional status indicator informing the remote access server of the number of results returned by the query and/or some other status indicia for the query. The process continues at step 964.

At step 964, a determination is made whether alternate scheduling information is found for the original program selected by the user. The remote access system may set minimum matching requirements for deciding whether appropriate alternate scheduling information has been located. In a typical usage scenario, the remote access system may use a "substantial similarity" test. In some embodiments, only scheduling information for programs having similarity ratings that satisfy the predetermined minimum criterion may pass the substantial similarity test and, consequently, be considered alternate scheduling information for the original program selected by the user. For example, assume that the similarity rating for the program information for a program associated with a channel may range from 0 to 100, where 0 indicates that the program is completely mismatched with the original program selected by the user, and 100 indicates an exact match with the original program selected by the user. In an illustrative substantial similarity test, the remote access system may set a predetermined minimum criterion that program information for the program may be considered alternate scheduling information for the original program selected by the user only if it has a similarity rating that is 50 or higher. If no other program passes the substantial similarity test, the remote access system may conclude that alternate scheduling information could not be located for the original program selected by the user. Note that the actual method for determining similarity between two or more programs may be based on any appropriate test or algorithm without deviating from the spirit of the invention. If alternate scheduling information is not found, the process may continue to step 970 (described in more detail below) where corrective action may be taken, and to step 974 where the user is informed that the action request could not be scheduled. Otherwise, the process may continue to step 966.

At step 966, the remote access user device or the remote access server may transmit alternate scheduling information to the user equipment (or to a service provider for subsequent transmission to the interactive media guidance application). The remote access system may also set minimum matching requirements for choosing which of several close-matching alternate scheduling information sets to transmit to the interactive media guidance application on the user equipment. In some embodiments, the program information for all channels that satisfy the predetermined minimum criterion as described in step 962 may be transmitted. In other embodiments, the program information for only the channel with the highest similarity rating may be transmitted. In still other embodiments, up to a predetermined number of program information for channels with highest similarity ratings may be transmitted. The alternate scheduling information may be transmitted in XML format similar to XML file 800 (FIG. 8). If alternate scheduling information includes scheduling information from multiple programs, the remote access server may send one XML file 800 each for the alternate scheduling information for each program, or send one XML file 800 including a list of the alternate scheduling information for all programs. After alternate scheduling information is transmitted, the process may continue to steps 968 (described below) and 970.

At step 970, remote access server 460 may transmit information regarding the disparity to a provider of program information for the remote access service. The data provider may use the disparity information to improve the accuracy of program information available to the remote access server for future request. In addition to transmitting information about the disparity, the remote access server may also store at least a portion of this information at step 972 for use in future action requests to interactive media guidance applications on user equipment devices using the same media service provider.

At step 968, the interactive media guidance application of media guidance system 400 receives alternate scheduling information for scheduling the requested action. Similar to step 912 described above, the interactive media guidance application on user equipment 402, 404 and/or 406 (all of FIG. 4) may receive the alternate scheduling information from the remote access server or alternatively, from a media guidance access server 490 (FIG. 4) of a media service provider for the interactive media guidance application. After the interactive media guidance application receives alternate scheduling information, the process may continue at step 980 (described above) where the interactive media guidance application on the user equipment schedules the action for the program based on the alternate scheduling information.

In practice, one or more steps shown, in process 900 may be combined with other steps, performed in any suitable order, performed in parallel (e.g., simultaneously or substantially simultaneously) or removed. For example, information regarding the disparity may be transmitted to a data provider for the remote access service at anytime after the disparity is detected, and steps 962 and 964 may be combined into a single step of searching for alternate scheduling information.

In some embodiments, the interactive media guidance application may schedule the requested action for the program (at step 980) prior to sending the program information included in the acknowledgement and independent of whether a disparity is later detected between the local guide data and the remote access program data. In these embodiments, each subsequent alternate scheduling information set sent to the interactive media guidance application for that action scheduling attempt may also include instructions to the interactive media guidance application to delete the previous scheduled action. The previous scheduled action to be deleted may be identified by back-feeding metadata included in the acknowledgment and/or previous action request.

Figure 10A:
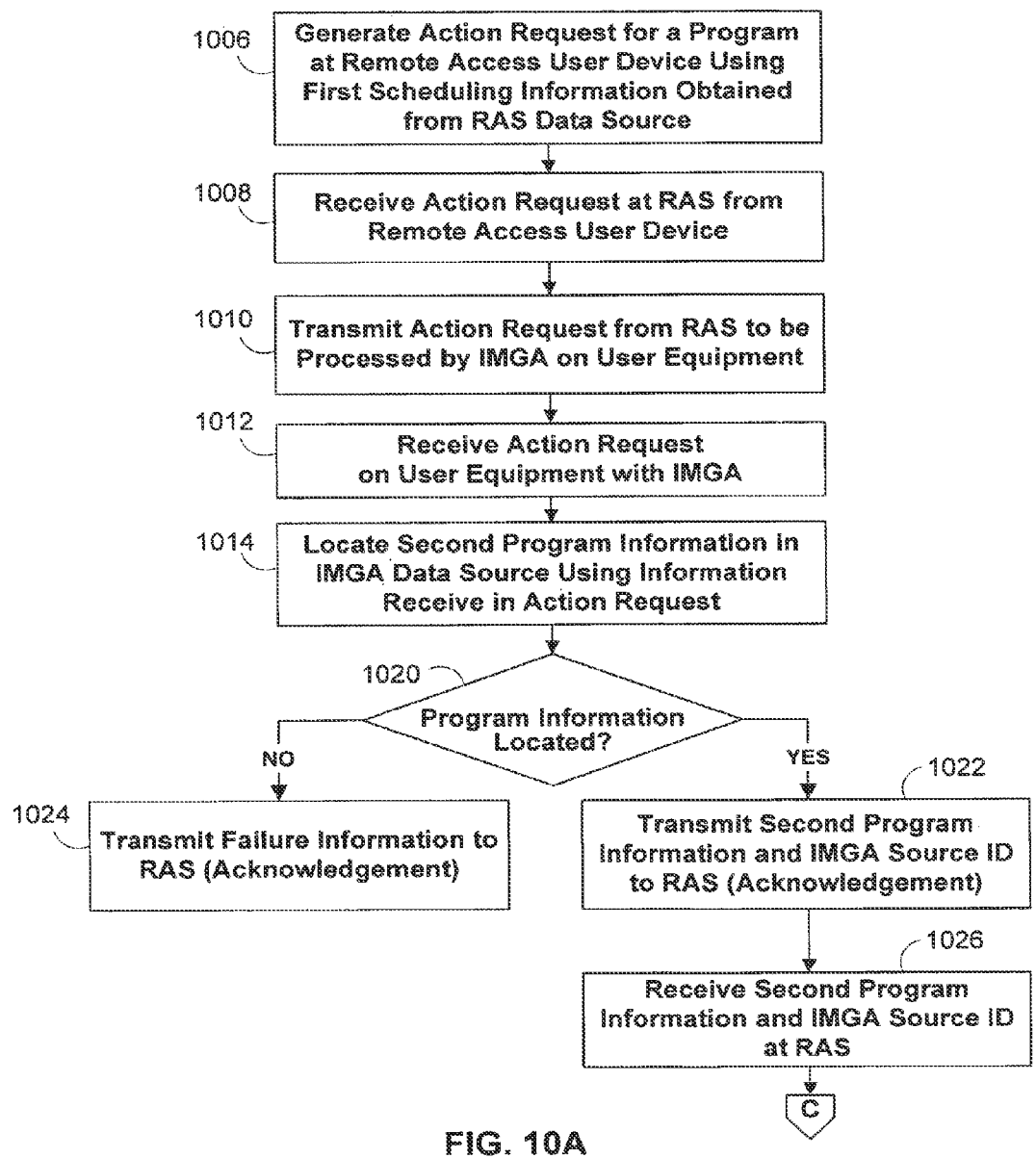
Figure 10B:
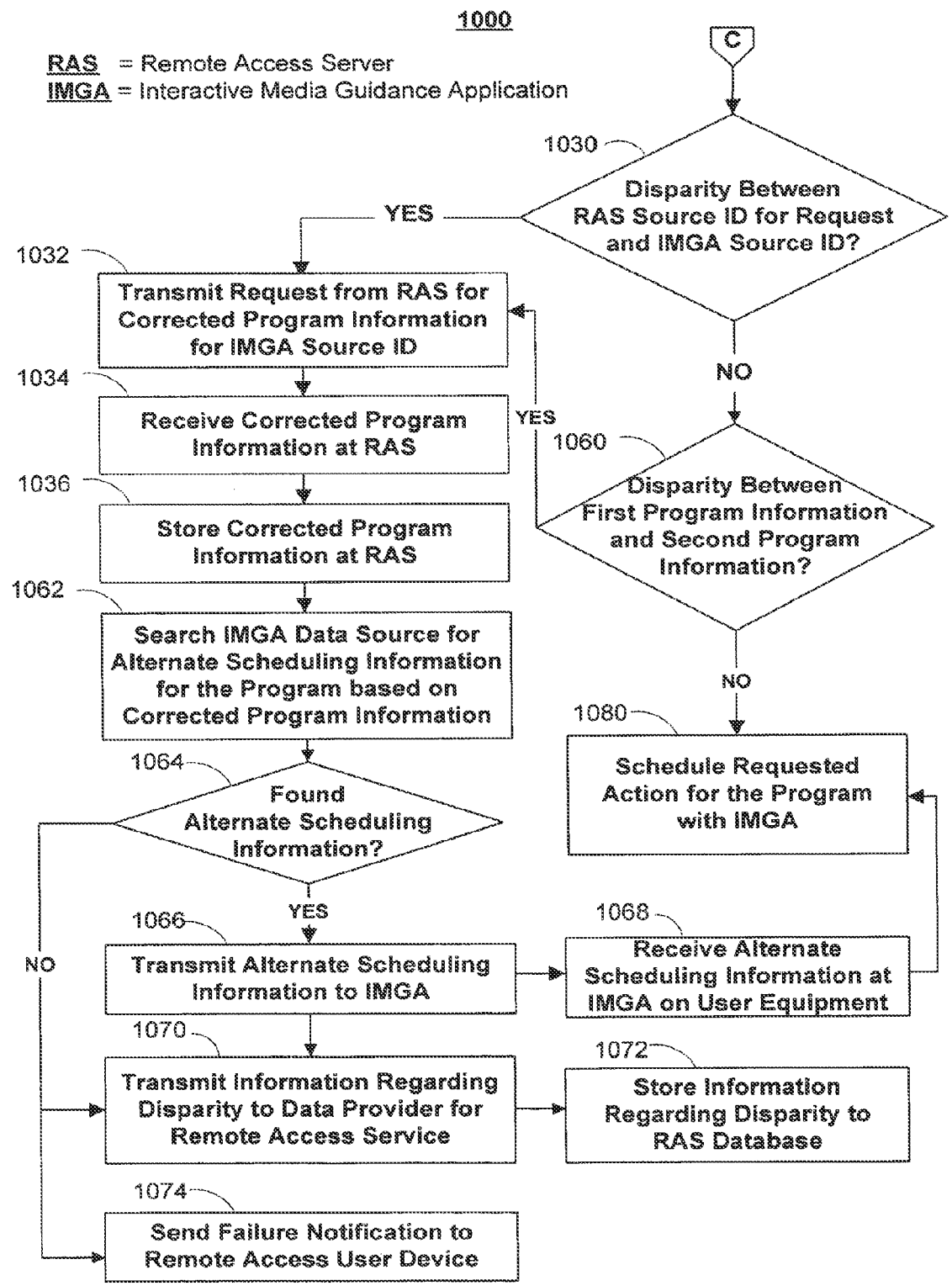

FIGS. 10A and 10B collectively show illustrative process 1000 for remotely scheduling an action request with interactive media guidance applications on user equipment according to one embodiment of the invention. In process 1000, steps 1006 through 1020, and step 1024 are equivalent to steps 906 through 920, and step 924 of process 900 (all of FIG. 9A) respectively. Step 1022 is equivalent to step 922 of process 900 (FIG. 9A), with the exception that at step 1022, the interactive media guidance application on the user equipment (or a remote server for a media service provider of the interactive media guidance application) also transmits the source identification (e.g., "HBO", "Spike TV") that may be providing data for the channel and start time information retrieved from the action request. The process continues to step 1026 which is similar to step 926 of process 900 (all of FIG. 9A) with the exception that, at step 1026, the remote access server also receives the source identification for the data provider for the channel and start time information included in the acknowledgement from the interactive media guidance application. The process continues at step 1030, where remote access server 460 (FIG. 4) determines whether there is a disparity between the data source ID for the interactive media guidance application on the user equipment and the data source ID used to by the remote access user device and/or the remote access server to generate the action request. If no disparity exists between the source IDs, the process continues to step 1060 and then to step 1080 which are equivalent to steps 960 and 980, respectively, of process 900 (FIG. 9).

If a disparity is detected between the source IDs, the process continues to step 1032 where the remote access server transmits a request for corrected program information to one or more of media guidance access server 490 (FIG. 4), media guidance data source 418 (FIG. 4), and the interactive media guidance application on the user equipment. Corrected program information is received at step 1034 at the remote access server and may be stored to storage 470 (FIG. 4) at step 1036. The process continues to step 1062 where the remote access server may search the media guidance data source of the interactive media guidance application based on the corrected remote access data for alternate scheduling information for the target program. As described above in connection with steps 961 to 963 of process 900 (FIG. 9) the remote access server may transmit a search request to media guidance access server 490 (FIG. 4) including a search string for the search. Alternatively, the remote access server may by-pass media guidance access server 490 and connect to media guidance access server 418 (FIG. 4) using, for example, a remote access connection. The search may be executed against the media guidance data source using processes and algorithms similar to those described above in connection with steps 962 (FIG. 9) and the search results may be received at the remote access server using processes and devices similar to those described in connection with step 963 of process 900 (FIG. 9). The process continues with steps 1064 through 1080 which are equivalent to steps 964 through 980 respectively of process 900 (FIG. 9).

In practice, one or more steps shown in process 1000 may be combined with other steps, performed in any suitable order, performed in parallel (e.g., simultaneously or substantially simultaneously) or removed.

In some embodiments, API 496 of media guidance access server 490 (FIG. 4) may accept or possibly require action requests that specify an actual source (e.g., "HBO") in addition to or instead of a channel (e.g., 100). This may be especially relevant where, for example, the channel for a source is shared by multiple sources at different times of the day. Since the source ID is generally more specific than a channel number, using the source ID in place of or in addition to the channel number tends to increase the accuracy of the remote access service. However, inconsistencies in source identification schemes used by the remote access service and the interactive media guidance application may lead to disparities between program listings information used by the two platforms and lead to recording errors. Furthermore, among media service providers, the same source may be identified by a different name or identifier. For example, a source identified as "Spike TV" by the remote access service may be identified as "SPK" by one media guidance application and "100-Spike" by yet another. Hence, the remote access server may maintain a table cross-references source identification information between the remote access service and media service providers.

FIG. 11A shows illustrative lookup table 1100 for cross-referencing source identification information between the remote access service provider and various media service providers according to one embodiment of the invention. Lookup table 1100 may include source identification information for various media service providers. Lookup table 1100 may include (1) a column 1102 of source identifiers for the remote access program listings, where each source identifier (which is a cell in the column) identifies a different program information source available to the remote access service; and (2) a row of media service providers 1104, where each media service provider (which is a cell in row) identifies a program listings source used by one or more interactive media guidance applications and is different from the program listings source used by the remote access service. Lookup table 1100 also includes cells of source identifiers, such as source identifier 1108, which corresponds the media service provider's source identifier to the remote access server's source identifier specified in column 1102 of the same row. The remote access service may include the source identifier for each media service provider in the action request in addition to or instead of, for example, the channel number.

The remote access server may also include a lookup table (that is similar to lookup table 1100) for managing inconsistencies between program identification used by media service providers and that used by the remote access service. FIG. 11B shows illustrative lookup table 1150 for cross-referencing program identification information between the remote access service provider and various media service providers according to one embodiment of the invention. Lookup table 1150 may include (1) a column 1152 of program identifiers for the remote access program listings, where each program identifier (which is a cell in the column) identifies a different program available to the remote access service; and (2) a row of media service provider identifiers 1154, where each media service provider (which is a cell in row) identifies a program listings source used by one or more interactive media guidance applications and that is different from the program listings source used by the remote access service. Lookup table 1150 also includes cells of program identifiers, such as program identifier 1158, which corresponds the media service provider's program identifier to the remote access server's program for the same program identified in column 1152 for the same row. The remote access service may include the program identifier for each media service provider in the action request in addition to or instead of, for example, the channel number.

Lookup tables 1100 and 1150 may be stored on storage device 470 (FIG. 4) in any suitable format such as, in Structured Query Language (SQL) format. Furthermore, any suitable layout may be used. For example, instead of one table for all media service providers, the remote access service may have a separate table for each media service provider.

Figure 12:
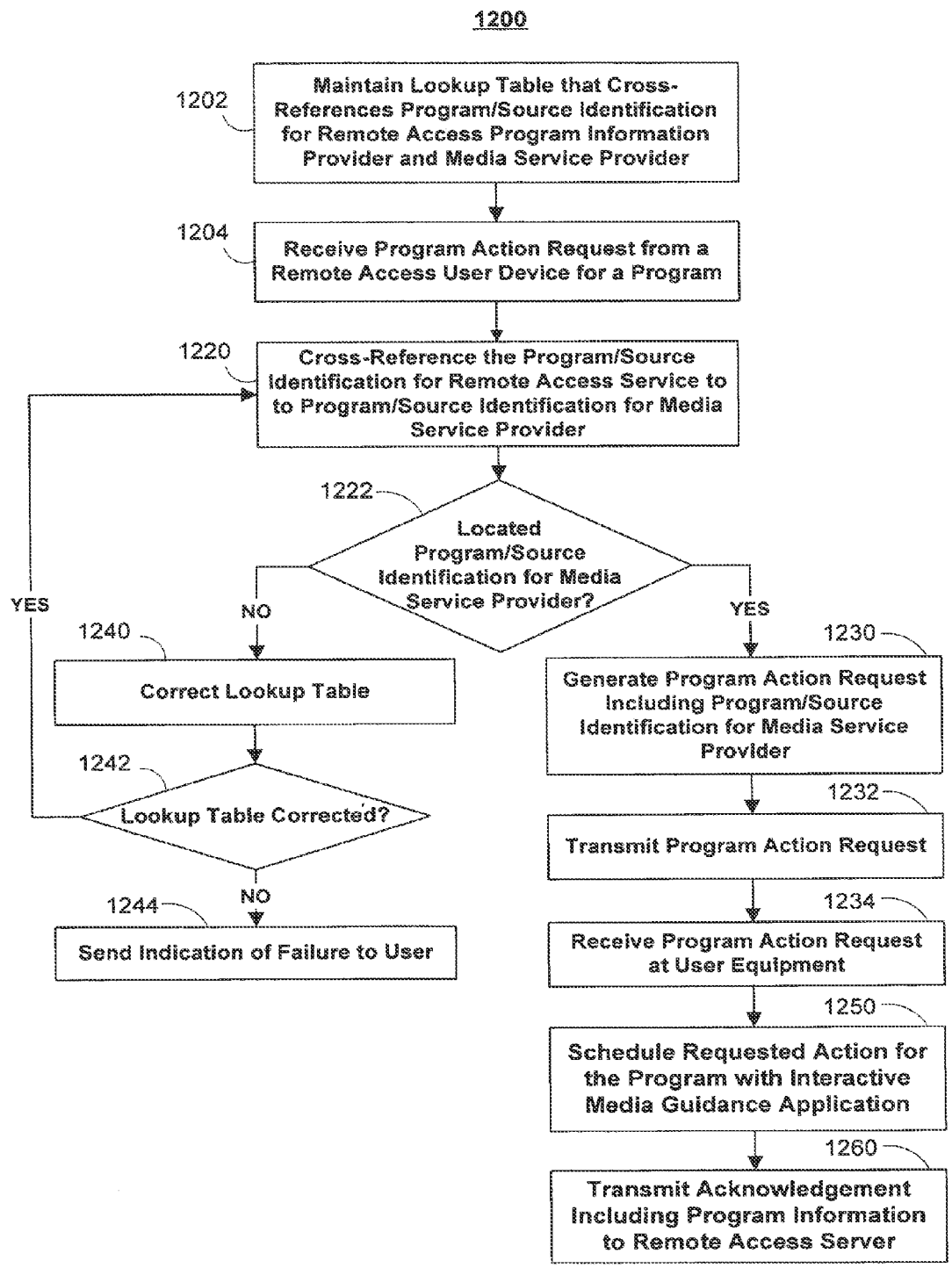

FIG. 12 shows illustrative process 1200 for remotely scheduling an action request with interactive media guidance applications on user equipment using a lookup table maintained by the remote access system. At step 1202, remote access server 460 (FIG. 4) maintains lookup tables (such as lookup tables 1100 and 1150 of FIG. 11) for cross-referencing program and/or source identification information for the remote access program information provider and the media service program information provider. At step 1204, remote access server 460 (FIG. 4) receives an action request for a program from remote access user device 440 (FIG. 4). The action request may include the media service provider 530 (FIG. 5) selected by the user and the program identifier for the program selected by the user. As shown in lookup tables 1100 and 1150 (both of FIG. 11), the remote access server and the media service provider 530 (FIG. 5) selected by the user may differ in their identification of programs and/or media sources. Therefore, the process continues to step 1220, where the remote access server attempts to cross-reference the program and/or media source identifiers in the action request to the program and/or source identifiers of the selected media service provider 530 (FIG. 5) using lookup tables 1100 and 1150 (both of FIG. 11). It should be noted that in some embodiments, the remote access server may perform the cross-reference at step 1220 when the user selects a media service provider 530 (FIG. 5). Hence, in these embodiments, the action request received at step 1204 may include identifiers for the media service provider 530 (FIG. 5) and, therefore, step 1220 may be performed before step 1204. The process continues to step 1222.

At step 1222, a determination is made whether the remote access server was able to cross-reference the its program and/or media source identifiers with that of media service provider 530 (FIG. 5). In some embodiments, the remote access server may not find the proper cross-reference if media service provider 530 (FIG. 5) selected by the user does not have identifier information in lookup tables 1100 and/or 1150 (both of FIG. 11). If corresponding program and/or source identifier is not located for the program (or the media service provider); the process continues to step 1240 (described below). Otherwise, the process continues to step 1230.

At step 1230, remote access server 460 (FIG. 4) generates an action request for the program including the program and/or media source information for the program. The devices and processes used to generate the action request in steps 906 and 1006 of FIGS. 9 and 10, respectively. The action request may include program and/or source identifiers for the media service provider where the media guidance access server 490 (FIG. 4) for the media service provider (or the interactive media guidance application on the user equipment) supports including this information in the action request. Alternatively or additionally, the program and source identifier for the media service provider may be used by the remote access server to improve the accuracy of scheduling information (e.g., the channel and the start time) included in the request. The process continues to step 1232.

At step 1232, the action request for the program is transmitted for processing by the interactive media guidance application. Similar to step 910 (FIG. 9A) the program action request may be transmitted to the interactive media guidance application on the user equipment (or to the media service provider for subsequent transmission to the interactive media guidance application on the user equipment). The process continues to step 1234 where the action request is received by interactive media guidance application, and then to step 1250 where the action is scheduled with the interactive media guidance application. After the requested action is scheduled with the interactive media guidance application, the media guidance application may transmit an acknowledgement back to the remote access server. Similar to step 922 (FIG. 9A), the acknowledgement may include program information for the actual program against which the action was scheduled. The remote access server may receive the information and compare the received program information with its own program information for the target program selected by the user to detect any disparities. Although not shown on the drawings, step 1250 may involve the request-response sequences described in connection with process 900 (FIG. 9) to ensure that the requested action is scheduled for the target program.

Returning to step 1222, if source and/or program identification information is not found for the selected media service provider, the remote access server may take steps at step 1240 to update the lookup tables. For example, the remote access server may place requests to the media service provider for updated program and/or source information and store the response to the lookup tables. At step 1242, a determination is made whether the lookup tables have been corrected. If the have been corrected, the process may return to step 1220 to continue processing the user's request. Otherwise, the user is notified at step 1244 that the request failed.

In practice, one or more steps shown in process 1200 may be combined with other steps, performed in any suitable order, performed in parallel (e.g., simultaneously or substantially simultaneously) or removed.

Figure 13:
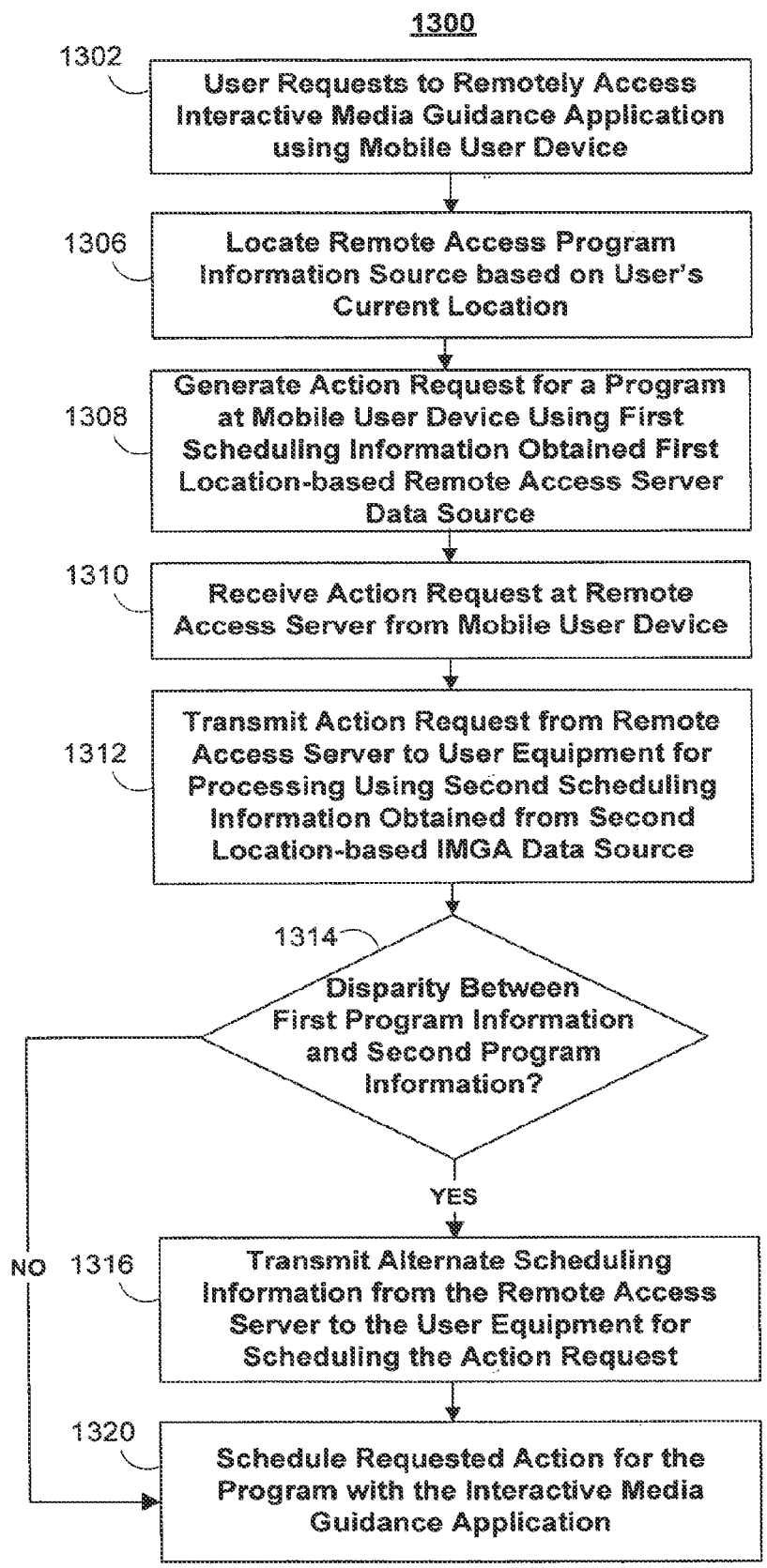

FIG. 13 shows illustrative process 1300 for remotely accessing user equipment implementing an interactive media guidance application from a mobile device having location positioning functionality according to one embodiment of the invention. In this embodiment, the data source used by the remote access server and the data source used by the interactive media guidance application may be selected based on their respective locations. In a typical usage scenario, a user of mobile remote access user device 440 may be in a geographical location (e.g., zip code) that differs from the geographical location of the user equipment. There is therefore at least a possibility that the programming information available to the two geographical areas may differ. Process 1300 is an illustrative process for managing this discrepancy.

In process 1300, at step 1302, remote access client 442 (FIG. 4) receives a request from an authorized user of the remote access server. In some embodiments, the user may authenticate or otherwise identify with remote access client 442. The process continues to step 1306. At step 1306, remote access server 460 locates a program information source for mobile remote access user device 440 based on the current location of the device. Any suitable mobile remote access user device 440 with location-positioning functionality may be used such as, a cellular telephone, a laptop computer, a personal digital assistant (PDA), a handheld computer, a portable television system, and an automobile television system. The current location of the mobile remote access user device may be detected using location-positioning circuitry 448 in mobile remote access user device 440 (all of FIG. 4). At step 1308, the remote access user device generates an action request using program information obtained from location-based program data for remote access server 460. Similar to step 906 (FIG. 9A), the request may be fully generated by the mobile remote access user device or in conjunction with the remote access server. At step 1310, the remote access server receives the action request from the mobile remote access user device. At step 1312, the remote access server transmits the action request to the interactive media guidance application on the user equipment. The interactive media guidance application on the user equipment may receive the action request from the remote access server or from an intermediate remote server for a media service provider of the interactive media guidance application. The interactive media guidance application schedules the requested action based on the programming information for its own geographical location provided by the media service provider. After the action request is scheduled, the interactive media guidance application may send an acknowledgment similar to XML file 810 to remote access server 460. At step 1314, remote access server 460 may use any of the processes previously described in connection with FIG. 9 and FIG. 10 to determine if a disparity exists between the program information for the target program on the remote access server and the program information for the actual program included in the acknowledgement received from the interactive media guidance application. If no disparity is detected, the process continues to step 1320 where the request is scheduled with the interactive media guidance application on the user equipment. The processes and devices used at step 1320 are similar to those described above in connection with step 980 of FIG. 9. If a disparity exists between the program information for the target program on the remote access server and the program information for the actual program included in the acknowledgement received from the interactive media guidance application, the process continues to step 1316. At step 1316, the remote access server transmits alternate scheduling information for the target program to the interactive media guidance application for scheduling the requested action for the program on the user equipment. The search for alternate scheduling information may use similar devices and processes as those described in connection with steps 962 and 964 (both of FIG. 9B). The process continues at step 1320 (described above) where the interactive media guidance application schedules the requested action for the program based on the alternate scheduling, information transmitted by the remote access server at step 1316.

In practice, one or more steps shown in process 1300 may be combined with other steps, performed in any suitable order, performed in parallel (e.g., simultaneously or substantially simultaneously) or removed.

It will be appreciated that while the discussion of media content has focused on video content, the principles of media guidance can be applied to other types of media content, such as music, images, and multi-media content.

The above described embodiments of the present invention are presented for purposes of illustration and not of limitation, and the present invention is limited only by the claims which follow.

What is claimed is:

1. A method for remotely accessing user equipment from a mobile user device having location positioning functionality, the method comprising:

receiving an action request from the mobile user device to schedule an action for a program to be performed by the user equipment, wherein the mobile user device utilizes first-location program information to generate the action request for the program, and the first-location program information is selected based, at least in part, on a location of the mobile user device at the time of the request;

in response to receiving the action request, detecting, using program information received in the action request, a disparity between the first-location program information for the program and second-location program information for the program, wherein the second-location program information is selected based, at least in part, on a location of the user equipment on which the action is to be scheduled, and the location of the user equipment is different from the location of the mobile user device at the time of the request;

in response to detecting the disparity, searching for alternate scheduling information for the program for use in scheduling the action; and transmitting the alternate scheduling information to the user equipment for scheduling the action.

2. The method defined in claim 1 wherein:

the mobile user device is selected from the group consisting of a cellular telephone, a laptop computer, a personal digital assistant, a handheld computer, a portable television system, and an automobile television system.

3. The method defined in claim 1 wherein: the mobile user device includes a global positioning system (GPS) to perform the location positioning functionality.

4. The method defined in claim 1 wherein:
the location positioning functionality is performed utilizing a cellular telephone network.

5. The method defined in claim 1 wherein: the location positioning functionality is performed by an automobile navigation system.

6. The method defined in claim 1 further comprising:
transmitting the action request to a media service provider or to the user equipment.

7. The method defined in claim 6 wherein the media service provider is selected from the group consisting of: a cable service provider, and a satellite service provider.

8. The method defined in claim 1 wherein the action is selected from the group consisting of: scheduling a recording of the program and setting a reminder for the program.

9. The method defined in claim 1 further comprising scheduling the action using an interactive media guidance application implemented on the user equipment.

10. The method defined in claim 1 wherein:
the receiving an action request comprises the receiving an action request at a server remote from a user mobile device, and
the detecting, using program information received in the action request, a disparity comprises the detecting, at the server, using program information received in the action request, a disparity.

11. The method defined in claim 10 wherein the action request comprises one or more interactive program guide functions executed on the set-top box.

12. The method defined in claim 1 further comprising transmitting to the user equipment a channel and a start time for the program.

13. The method of claim 1, further comprising providing an option on the mobile user device to select the program from a plurality of programs scheduled for future presentation at the location of the mobile user device.

14. The method of claim 1, wherein:
the receiving comprises receiving the request by a first server that is associated with a first database from which the first-location program information is obtained, the method further comprising:
transmitting the request by the first server to a second server that is associated with a second database from which the second-location program information is obtained, wherein the detecting comprises detecting the disparity by the second server.

15. The method of claim 14, wherein the first database includes program information for a plurality of media service providers.

16. The method of claim 14, further comprising:
maintaining a lookup table that cross-references program information from the first database with program information for a plurality of media service providers; and
wherein searching for alternate scheduling information comprises cross-referencing a program identifier associated with the request with a corresponding program identifier for each of the plurality media service providers in the lookup table.

17. The method of claim 14, wherein the second server is associated with a media service provider for the user equipment and the first server is associated with a remote access service provider different from the media service provider.

18. A system for remotely accessing user equipment from a mobile user device having location positioning functionality, the system comprising a processor configured to:
receive an action request from the mobile user device to schedule an action for a program to be performed by the user equipment, wherein the mobile user device utilizes first-location program information to generate the action request for the program, and the first-location program information is selected based, at least in part, on a location of the mobile user device at the time of the request;
in response to receiving the action request, detect, using program information received in the action request, a disparity between the first-location program information for the program and second-location program information for the program, wherein the second-location program information is selected based, at least in part, on a location of the user equipment on which the action is to be scheduled, and the location of the user equipment is different from the location of the mobile user device;
in response to detecting the disparity, search for alternate scheduling information for the program for use in scheduling the action; and
transmit the alternate scheduling information to the user equipment for scheduling the action.

19. The system defined in claim 18 wherein:
the mobile user device is selected from the group consisting of a cellular telephone, a laptop computer, a personal digital assistant, a handheld computer, a portable television system, and an automobile television system.

20. The system defined in claim 18 wherein: the mobile user device includes a global positioning system (GPS) to perform the location positioning functionality.

21. The system defined in claim 18 wherein:
the location positioning functionality is performed utilizing a cellular telephone network.

22. The system defined in claim 18 wherein:
the location positioning functionality is performed by an automobile navigation system.

23. The system defined in claim 18 wherein the processor is further configured to transmit the action request to a media service provider or to the user equipment.

24. The system defined in claim 23 wherein the media service provider is selected from the group consisting of: a cable service provider, and a satellite service provider.

25. The system defined in claim 18 wherein the action is selected from the group consisting of: scheduling a recording of the program, and setting a reminder for the program.

26. The system defined in claim 18 wherein the processor is further configured to schedule the action using an interactive media guidance application implemented on the user equipment.

27. The system defined in claim 18 wherein:
the receive an action request comprises the receive an action request at a server remote from the user mobile device, and
the detect, using program information received in the action request, a disparity comprises the detect, at the server, using program information received in the action request, a disparity.

28. The system defined in claim 27 wherein the action request comprises one or more interactive program guide functions executed on the set-top box.

29. The system defined in claim 18 wherein the processor is further configured to transmit to the user equipment a channel and a start time for the program.

30. The system of claim 18, wherein the processor is further configured to provide on the mobile user device an option to select the program from a plurality of programs scheduled for future presentation at the location of the mobile user device.

31. The system of claim 18, wherein the processor is configured to:
   receive the request from the mobile user device using a first server that is associated with a first database from which the first-location program information is obtained;
   transmit the request by the first server to a second server; and
   detect the disparity using the second server, wherein the second server is associated with a second database from which the second-location program information is obtained.

32. The system of claim 31, wherein the first database includes program information for a plurality of media service providers.

33. The system of claim 31, wherein the processor in further configured to:
   maintain a lookup table that cross-references program information from the first database with program information for a plurality of media service providers; and
   search for alternate scheduling information by cross-referencing a program identifier associated with the request with a corresponding program identifier for each of the plurality media service providers in the lookup table.

34. The system of claim 31, wherein the second server is associated with a media service provider for the user equipment and the first server is associated with a remote access service provider different from the media service provider.

35. A method for remotely accessing user equipment from a mobile user device having location positioning functionality, the method comprising:

receiving, at a server remote from the mobile user device, an action request from the mobile user device to schedule an action for a program to be performed by the user equipment, wherein the mobile user device utilizes first-location program information to generate the action request for the program, and the first-location program information is selected based, at least in part, on a location of the mobile user device at the time of the request;

transmitting the action request to the user equipment;

receiving, from the user equipment, second program information for the program at the server, wherein the second-location program information is selected by the user equipment based, at least in part, on a location of the user equipment on which the action is to be scheduled, and the location of the user equipment is different from the location of the mobile user device at the time of the request;

in response to receiving the action request, detecting, with the server, using program information received in the action request and using the second program information for the program received from the user equipment, a disparity between the first-location program information for the program and second-location program information for the program;

in response to detecting the disparity, searching, with the server, for alternate scheduling information for the program for use in scheduling the action; and transmitting the alternate scheduling information to the user equipment for scheduling the action.

* * * * *